United States Patent
Ueda

(10) Patent No.: US 12,546,239 B2
(45) Date of Patent: Feb. 10, 2026

(54) OIL PASSAGE CONTROL VALVE AND VALVE TIMING VARYING DEVICE

(71) Applicant: MIKUNI CORPORATION, Tokyo (JP)

(72) Inventor: Masashi Ueda, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/973,076

(22) Filed: Dec. 8, 2024

(65) Prior Publication Data

US 2025/0207517 A1     Jun. 26, 2025

(30) Foreign Application Priority Data

Dec. 26, 2023  (JP) ................................. 2023-218962

(51) Int. Cl.
  *F01L 1/344*  (2006.01)
(52) U.S. Cl.
  CPC .......... *F01L 1/34413* (2013.01); *F01L 1/3442* (2013.01); *F01L 2001/3444* (2013.01)
(58) Field of Classification Search
  CPC .......... F01L 1/34413; F01L 2001/34426; F01L 2001/3444
  See application file for complete search history.

(56) References Cited

U.S. PATENT DOCUMENTS

| | | | | |
|---|---|---|---|---|
| 2011/0226204 A1* | 9/2011 | Hoppe | ................... | F01L 1/344 |
| | | | | 210/495 |
| 2021/0062689 A1* | 3/2021 | Oikawa | ................ | F01L 1/3442 |

FOREIGN PATENT DOCUMENTS

| | | | | |
|---|---|---|---|---|
| DE | 102007050447 A1 * | 4/2009 | ............. | F01L 1/344 |
| DE | 102012207477 A1 * | 11/2013 | ............ | F01L 1/3442 |
| JP | 2014185630 A | * 10/2014 | | |
| JP | 6504396 | 4/2019 | | |
| JP | 6623539 | 12/2019 | | |
| WO | WO-2020196404 A1 * | 10/2020 | .......... | F16K 11/0704 |
| WO | WO-2020196457 A1 * | 10/2020 | ........ | F16K 31/0613 |

* cited by examiner

*Primary Examiner* — Ngoc T Nguyen
(74) *Attorney, Agent, or Firm* — JCIPRNET

(57) ABSTRACT

An oil passage control valve include: a sleeve, including an internal passage extending in an axis direction and through which hydraulic oil passes, an annular groove formed on an outer periphery, and an opening penetrating in a radial direction in a region of the annular groove and through which hydraulic oil passes; a valve body, slidably housed in the internal passage and opening and closing the opening; a filter member of a strip-like shape, annularly wrapped around and fixed to the annular groove; and a drive element, driving the valve body. The sleeve includes a protrusion protruding from a bottom surface and a side surface of the annular groove at a position offset from the opening within the region of the annular groove. The filter member includes a notch engaged with the protrusion, a filtration part facing the opening, and a joint where both end regions overlap.

16 Claims, 23 Drawing Sheets

OIL PASSAGE CONTROL VALVE AND VALVE TIMING VARYING DEVICE

CROSS-REFERENCE TO RELATED APPLICATIONS

This application claims the priority benefit of Japan Application No. 2023-218962, filed on Dec. 26, 2023. The entirety of the above-mentioned patent application is hereby incorporated by reference herein and made a part of this specification.

BACKGROUND

Technical Field

The disclosure relates to an oil passage control valve opening and closing an oil passage of hydraulic oil and controlling the oil passage, and particularly relates to an oil passage control valve and a valve timing varying device that are applied when changing the opening and closing timing (valve timing) of an intake valve or an exhaust valve in an internal combustion engine mounted on a vehicle.

Related Art

As a conventional oil passage control valve, a hydraulic control valve is known that includes: a tubular valve body, including multiple annular grooves, an opening provided in the annular grooves, and a regulation part provided in a region offset from the opening of the annular grooves; a spool valve, slidably arranged inside the valve body and opening and closing the opening; and a filter, including a mesh part and a mask part that covers the regulation part, and fitted and fixed into the annular grooves of the valve body (for example, see Japanese Patent No. 6504396).

In this hydraulic control valve, the regulation part of the valve body is formed as a substantially rectangular convex part, and the mask part of the filter is formed as a concave part or concave groove molded to cover the convex part of the valve body from the outside. By covering the convex part of the valve body with the concave part or concave groove of the filter, the filter may be positioned in a circumferential direction of the annular grooves with respect to the valve body and be fitted into the annular grooves.

In this way, since the mask part of the filter is formed as a concave part or concave groove, the molding or machining of the mask part of the filter is complex, increasing the cost of the filter. In the case where the mask part forms a concave groove, when the filter of a strip-like shape is pulled from both sides and wrapped around the annular grooves, there is a risk that the mask part may extend and become unable to securely engage with the convex part serving as the regulation part, and the filter may be unable to be positioned at a predetermined position.

As another oil passage control valve, a valve device is known that includes: a cylindrical sleeve, including multiple annular grooves, an opening provided in the annular grooves, and an engaged part provided in a region offset from the opening of the annular grooves; a valve body, slidably arranged inside the sleeve and opening and closing the opening; and a filter member, formed in a C-shape using a metal plate having elasticity, including an engagement part engaged with the engaged part of the sleeve, and fitted and fixed into the annular grooves of the sleeve in a manner of being stretched and extended against elastic force (for example, see Japanese Patent No. 6623539).

In this valve device, the engaged part of the sleeve is formed as a concave groove obtained by reducing the thickness in an axis direction of the sleeve from the annular grooves, and the engagement part of the filter member is formed as an extending piece extending laterally from the width of the annular grooves.

In this way, since the engagement part of the filter member is in the form of extending from a side surface of a portion in an overall elongated shape, in the case where the filter member is formed by punching from a metal plate such as spring steel, there is a risk that an unnecessary region that is discarded may be generated by punching, and that a relatively thick metal plate may be required to obtain the desired elastic force, and material and machining costs may be increased.

SUMMARY

An oil passage control valve of the disclosure includes: a sleeve, including an internal passage extending in a predetermined axis direction and through which hydraulic oil passes, an annular groove formed on an outer periphery, and an opening penetrating in a radial direction in a region of the annular groove and through which hydraulic oil passes; a valve body, slidably housed in the internal passage and opening and closing the opening; a filter member of a strip-like shape, annularly wrapped around and fixed to the annular groove; and a drive element, driving the valve body. The sleeve includes a protrusion protruding from a bottom surface and a side surface of the annular groove at a position offset from the opening within the region of the annular groove. The filter member includes a notch engaged with the protrusion in a side part in a width direction in a state fixed to the annular groove, a filtration part facing the opening, and a joint where both end regions overlap.

A valve timing varying device of the disclosure is a valve timing varying device for an engine, configured to change the opening and closing timing of an intake valve or an exhaust valve driven by a camshaft. The valve timing varying device is configured to include: a housing rotor, rotating on an axis of the camshaft; a vane rotor, defining a retard chamber and an advance chamber in cooperation with the housing rotor and rotating on the axis; and an oil passage control valve, opening and closing an oil passage that supplies or discharges hydraulic oil to or from the retard chamber and the advance chamber, in which any of the oil passage control valves having the above configuration is adopted as the oil passage control valve.

DESCRIPTION OF THE EMBODIMENTS

Figure 1:
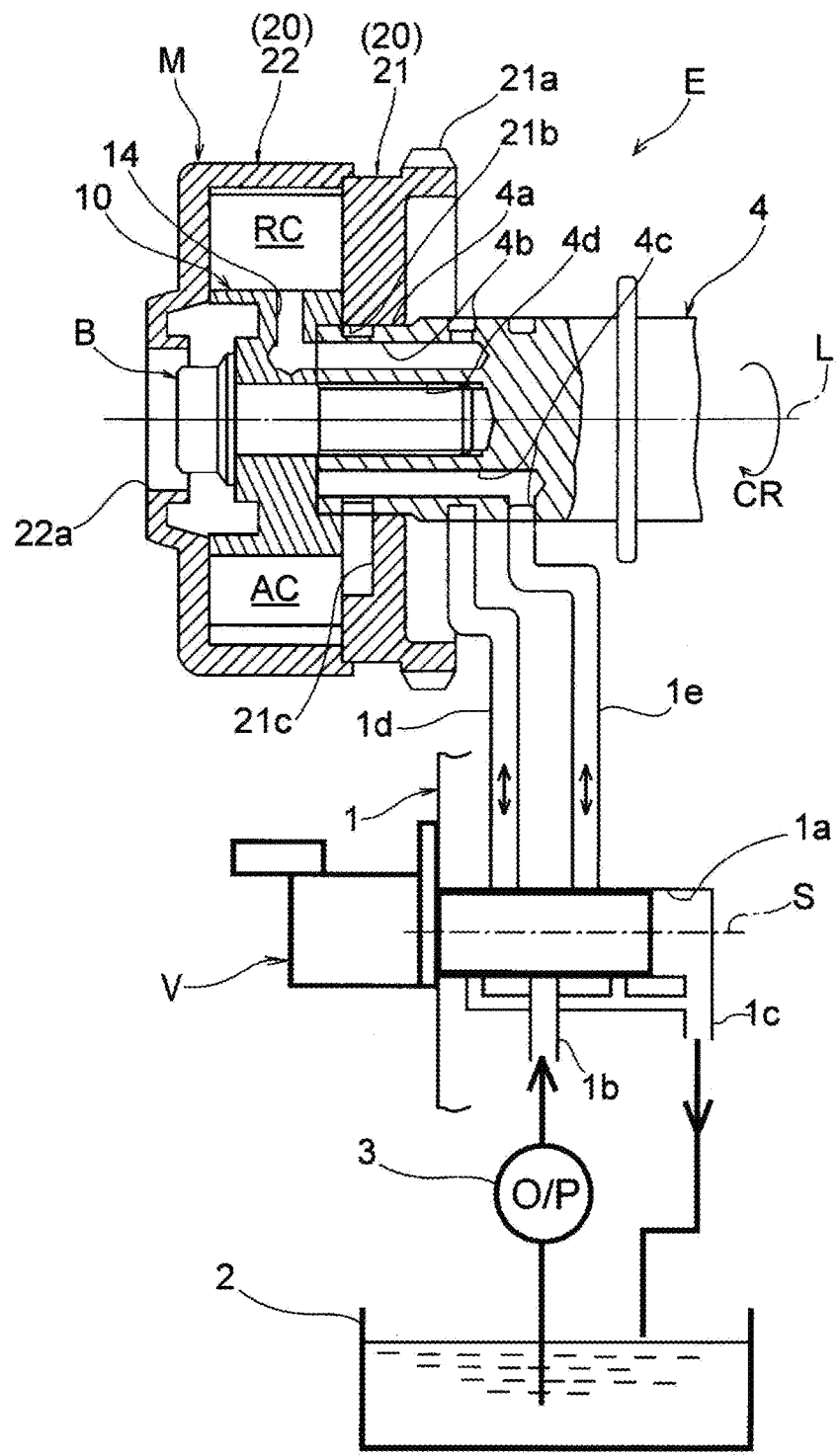
FIG. 1 is a configuration diagram showing a valve timing varying device including an oil passage control valve according to one embodiment of the disclosure.

The disclosure provides an oil passage control valve and a valve timing varying device that make it possible to simplify the structure as well as reduce the cost, weight, size or the like, in which a filter member can be easily positioned and fixed.

An oil passage control valve of the disclosure includes: a sleeve, including an internal passage extending in a predetermined axis direction and through which hydraulic oil passes, an annular groove formed on an outer periphery, and an opening penetrating in a radial direction in a region of the annular groove and through which hydraulic oil passes; a valve body, slidably housed in the internal passage and opening and closing the opening; a filter member of a strip-like shape, annularly wrapped around and fixed to the annular groove; and a drive element, driving the valve body. The sleeve includes a protrusion protruding from a bottom surface and a side surface of the annular groove at a position offset from the opening within the region of the annular groove. The filter member includes a notch engaged with the protrusion in a side part in a width direction in a state fixed to the annular groove, a filtration part facing the opening, and a joint where both end regions overlap.

In the above oil passage control valve, a configuration may be adopted in which the protrusion has a convex rectangular shape, and the notch has a concave rectangular shape.

In the above oil passage control valve, a configuration may be adopted in which the notch includes, in both side parts in a width direction of the filter member, a first notch and a second notch formed line-symmetrically with respect to a center line in a longitudinal direction of the filter member.

In the above oil passage control valve, a configuration may be adopted in which the annular groove includes, in a boundary region between a bottom surface with which the filter member is in close contact and each of side surfaces erected in the radial direction from both sides of the bottom surface, an annular lightening portion that is more recessed than the bottom surface.

In the above oil passage control valve, a configuration may be adopted in which the sleeve includes, to define the opening, multiple ports arranged in a circumferential direction in the annular groove and having an opening width smaller than a width of the annular groove, and multiple partition walls separating the multiple ports from each other. The multiple partition walls include a first partition wall on which the protrusion is located in the circumferential direction of the annular groove, and a second partition wall overlapping the joint of the filter member in the circumferential direction of the annular groove.

In the above oil passage control valve, a configuration may be adopted in which the multiple partition walls, except for the second partition wall, each include a communication groove that provides communication between two adjacent ports among the multiple ports between the bottom surface of the annular groove and an inner peripheral surface of the filter member.

In the above oil passage control valve, a configuration may be adopted in which the filter member is formed with the same length from the notch as the center to both ends in a longitudinal direction, and the second partition wall is formed at a position facing the first partition wall in the radial direction of the annular groove.

In the above oil passage control valve, a configuration may be adopted in which the joint of the filter member is subjected to welding.

In the above oil passage control valve, a configuration may be adopted in which the filtration part of the filter member includes multiple filtration holes, and a plate thickness of the filter member is smaller than a diameter of the filtration hole.

In the above oil passage control valve, a configuration may be adopted in which the drive element includes a biasing spring that biases the valve body to position the valve body at a rest position, and an electromagnetic actuator that exerts a driving force to position the valve body at an operating position against a biasing force of the biasing spring.

In the above oil passage control valve, a configuration may be adopted in which the annular groove includes a first annular groove, a second annular groove arranged adjacent to one side of the first annular groove in the axis direction, and a third annular groove arranged adjacent to the other side of the first annular groove in the axis direction. The opening includes a first opening formed in the first annular groove, a second opening formed in the second annular groove, and a third opening formed in the third annular groove. The filter member is wrapped around and fixed to each of the first annular groove, the second annular groove, and the third annular groove.

In the above oil passage control valve, a configuration may be adopted in which the first opening includes multiple ports that supply hydraulic oil into the sleeve, the second opening includes multiple ports that communicate with a first hydraulic chamber of an application target, and the third opening includes multiple ports that communicate with a second hydraulic chamber of the application target.

In the above oil passage control valve, a configuration may be adopted in which the sleeve includes a discharge opening formed in each of a region opposite to the first opening across the second opening in the axis direction and a region opposite to the first opening across the third opening in the axis direction, in order to discharge hydraulic oil.

In the above oil passage control valve, a configuration may be adopted in which the valve body includes a first valve part opening and closing an oil passage between the first opening and the second opening, and a second valve part opening and closing an oil passage between the first opening and the third opening.

In the above oil passage control valve, a configuration may be adopted in which the sleeve is formed to be fitted into a member that defines an oil passage through which hydraulic oil of an engine passes.

A valve timing varying device of the disclosure is a valve timing varying device for an engine, configured to change the opening and closing timing of an intake valve or an exhaust valve driven by a camshaft. The valve timing varying device is configured to include: a housing rotor, rotating on an axis of the camshaft; a vane rotor, defining a retard chamber and an advance chamber in cooperation with the housing rotor and rotating on the axis; and an oil passage control valve, opening and closing an oil passage that supplies or discharges hydraulic oil to or from the retard chamber and the advance chamber, in which any of the oil passage control valves having the above configuration is adopted as the oil passage control valve.

According to the oil passage control valve having the above configuration, the following oil passage control valve and a valve timing varying device including the oil passage control valve can be obtained, the oil passage control valve making it possible to simplify the structure as well as reduce the cost, weight, size or the like, in which a filter member can be easily positioned and fixed.

The disclosure will be described below with reference to the accompanying drawings.

An oil passage control valve according to one embodiment is applied to a valve timing varying device of an engine as an application target.

An engine E is an internal combustion engine. As shown in FIG. 1, the engine E includes: a main body 1, as a member defining an oil passage such as a cylinder block and a cylinder head; an oil pan 2, storing hydraulic oil; an oil pump 3, circulating hydraulic oil; a camshaft 4 on each of an intake side and an exhaust side; an intake valve and an exhaust valve (both not shown), driven to open and close by the camshaft 4; a valve timing varying device M, changing the opening and closing timing of the intake valve or exhaust valve; an oil passage control valve V; and so on.

The main body 1 includes a fitting hole 1a into which the oil passage control valve V is fitted, a supply oil passage 1b, a discharge oil passage 1c, a retard oil passage 1d, and an advance oil passage 1e.

The camshaft 4 is supported to rotate about an axis L (in the direction of arrow CR) in the cylinder head and drives the intake valve or exhaust valve to open and close.

The camshaft 4 includes a columnar part 4a, a retard oil passage 4b and an advance oil passage 4c supplying and discharging hydraulic oil, and a female screw part 4d into which a fastening bolt B is screwed.

Figure 20:
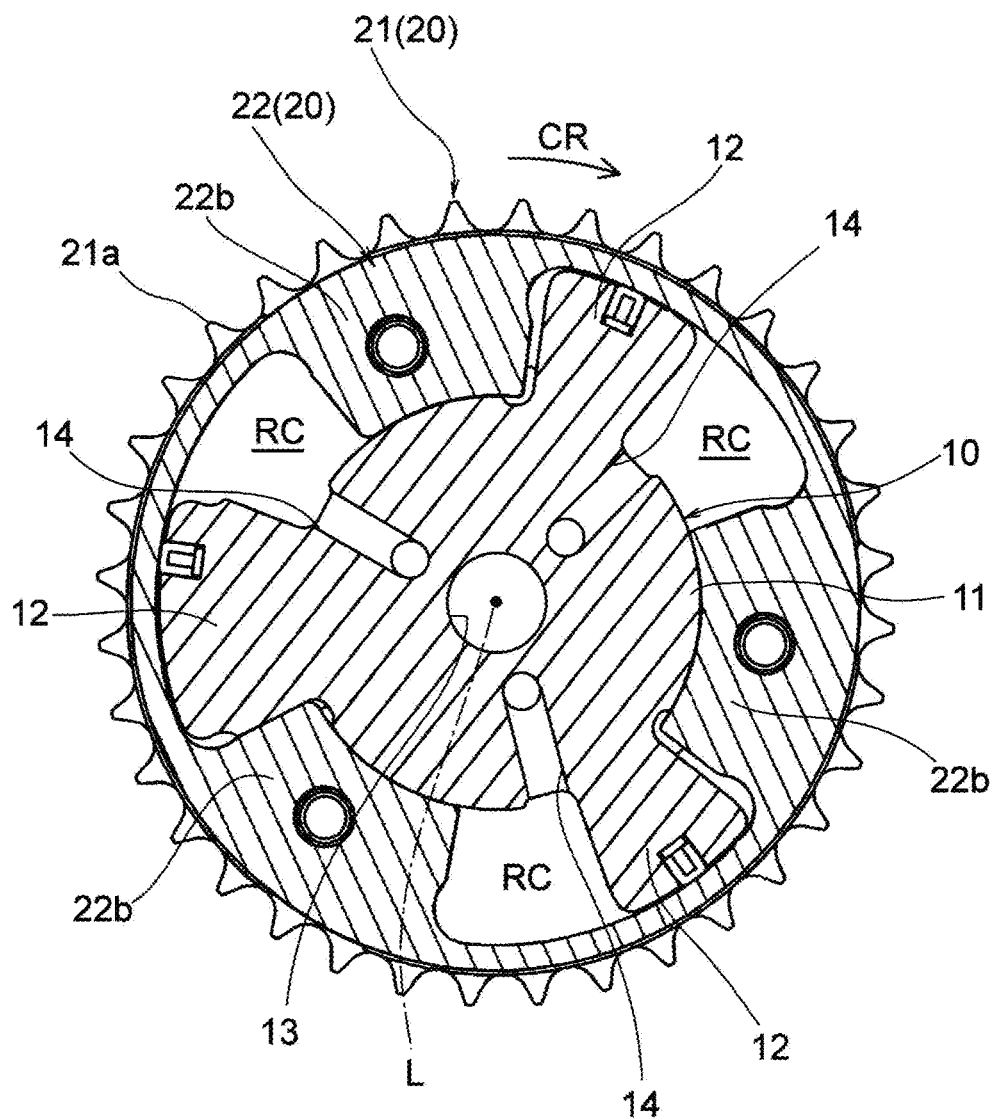
FIG. 20 is a cross-sectional view showing a positional relationship between a vane rotor and a housing rotor of the valve timing varying device in the state shown in FIG. 19.
Figure 22:
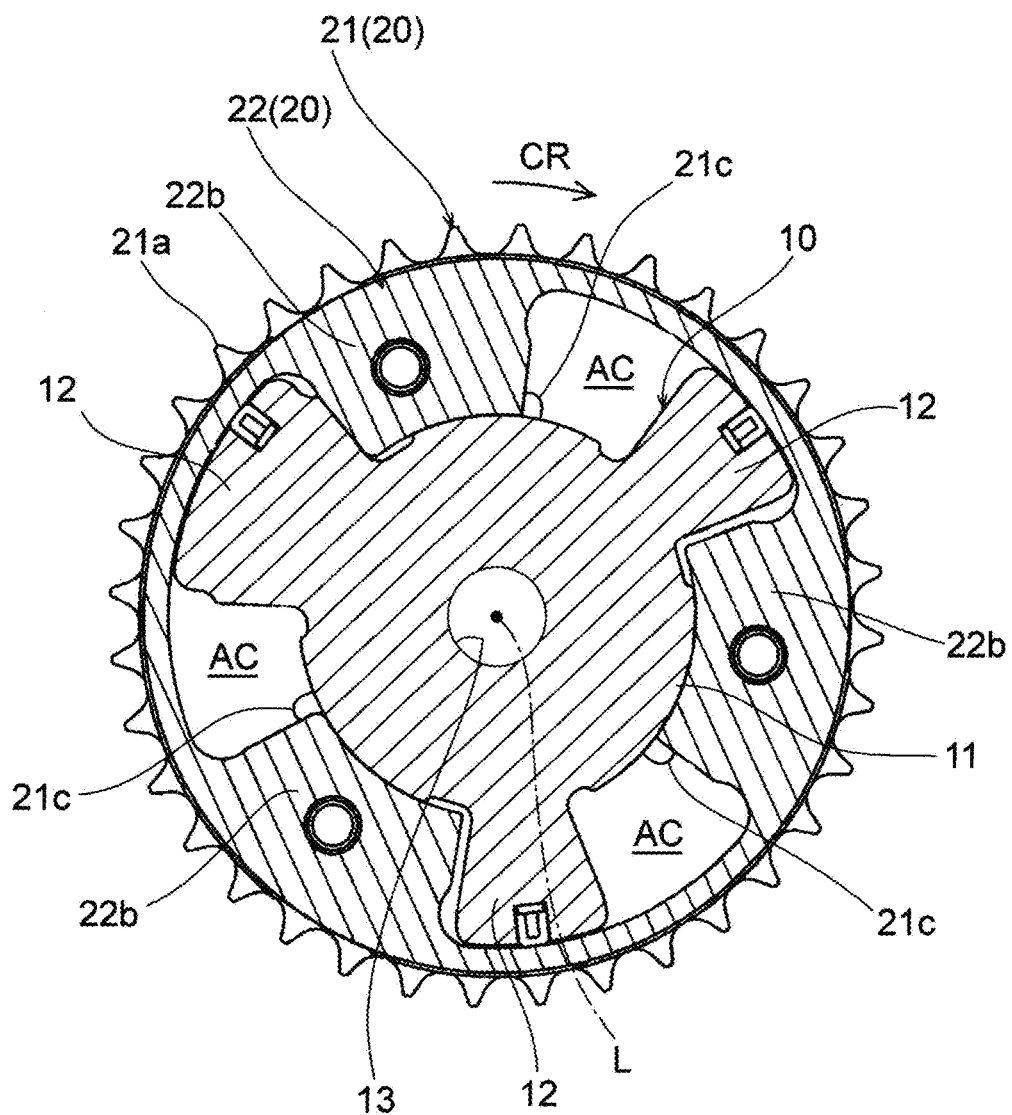
FIG. 22 is a cross-sectional view showing a positional relationship between a vane rotor and a housing rotor of the valve timing varying device in the state shown in FIG. 21.

As shown in FIG. 1, FIG. 20, and FIG. 22, the valve timing varying device M includes a vane rotor 10 that integrally rotates on the same axis L as the camshaft 4, and a housing rotor 20 that houses the vane rotor 10 and is relatively rotatable on the axis L.

The vane rotor 10 includes a hub 11 of a columnar shape, multiple (here, three) vanes 12, a through hole 13, and multiple (here, three) retard oil passages 14.

The housing rotor 20 has a two-piece structure consisting of a first housing rotor 21 of a substantially disc shape and a second housing rotor 22 of a bottomed cylindrical shape, which are fastened to each other by screws.

The first housing rotor 21 includes a sprocket 21a, an inner peripheral surface 21b rotatably fitted to the columnar part 4a of the camshaft 4, and multiple (here, three) advance oil passages 21c formed in a groove shape on a surface in which the vane rotor 10 is in close contact.

The second housing rotor 22 includes an opening 22a and multiple (here, three) shoe parts 22b.

The housing rotor 20 houses the vane rotor 10 in a manner that allows relative rotation within a predetermined angular range. A housing chamber thereof is formed to be divided by the vane 12 of the vane rotor 10 into two parts: a retard chamber RC as a first hydraulic chamber and an advance chamber AC as a second hydraulic chamber.

In the housing rotor 20, in conjunction with rotation of a crankshaft via a chain or the like, the hydraulic oil in the retard chamber RC and the advance chamber AC is adjusted by the oil passage control valve V, and a rotational driving force of the crankshaft is transmitted to the camshaft 4 through the vane rotor 10.

Figure 2:
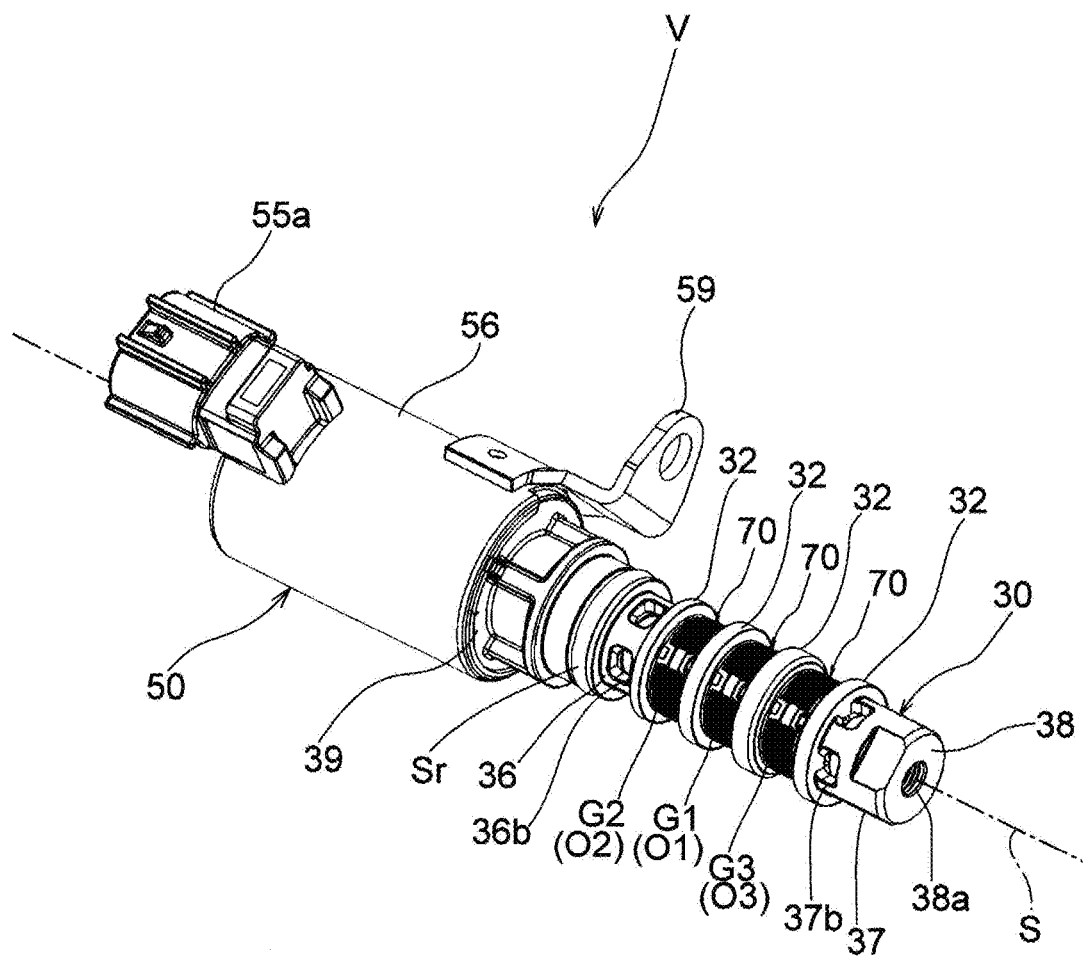
FIG. 2 is an external perspective view showing an oil passage control valve according to one embodiment.
Figure 3:
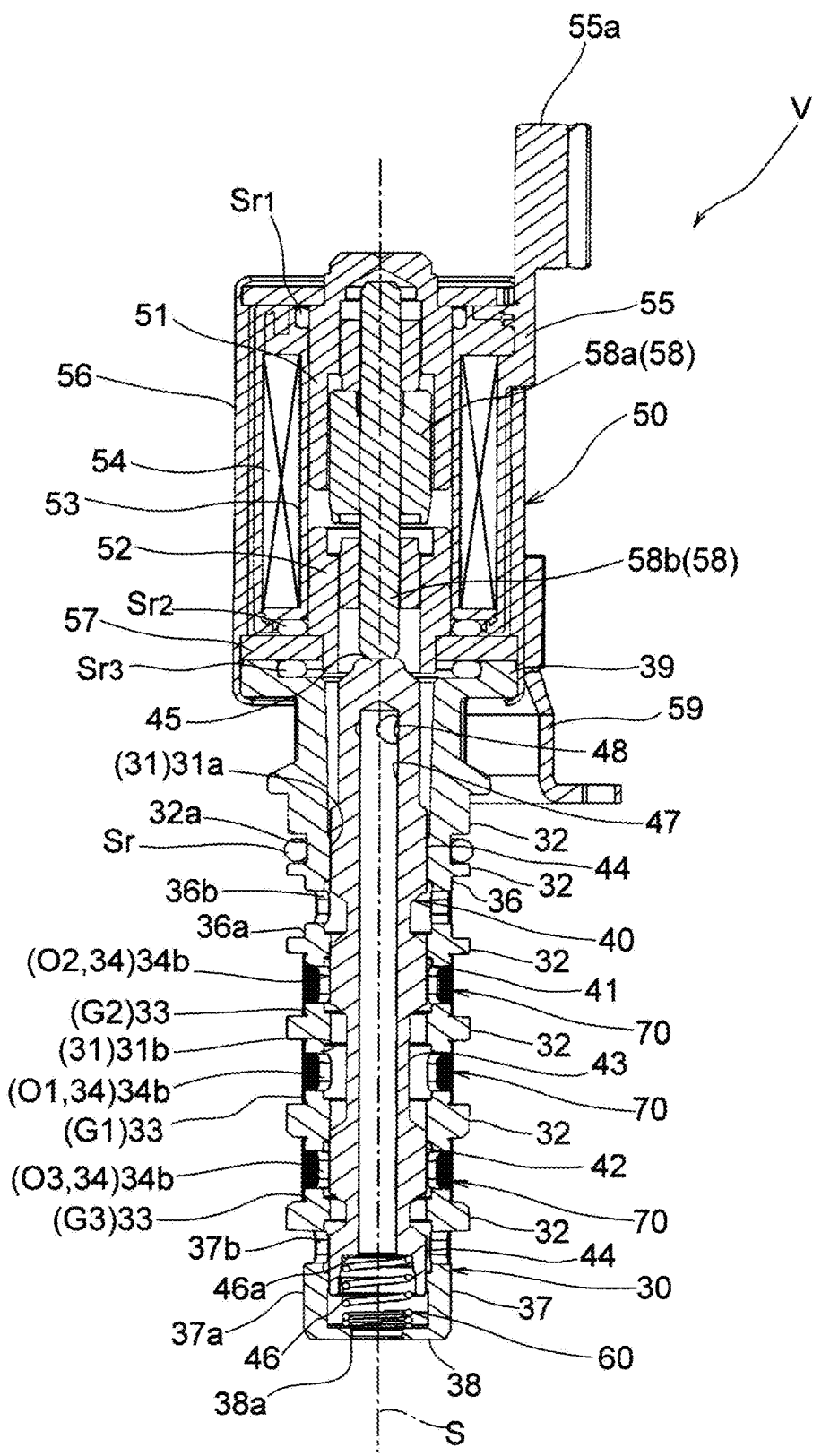
FIG. 3 is a cross-sectional view of an oil passage control valve according to one embodiment, cut along a plane including an axis of a sleeve.
Figure 5:
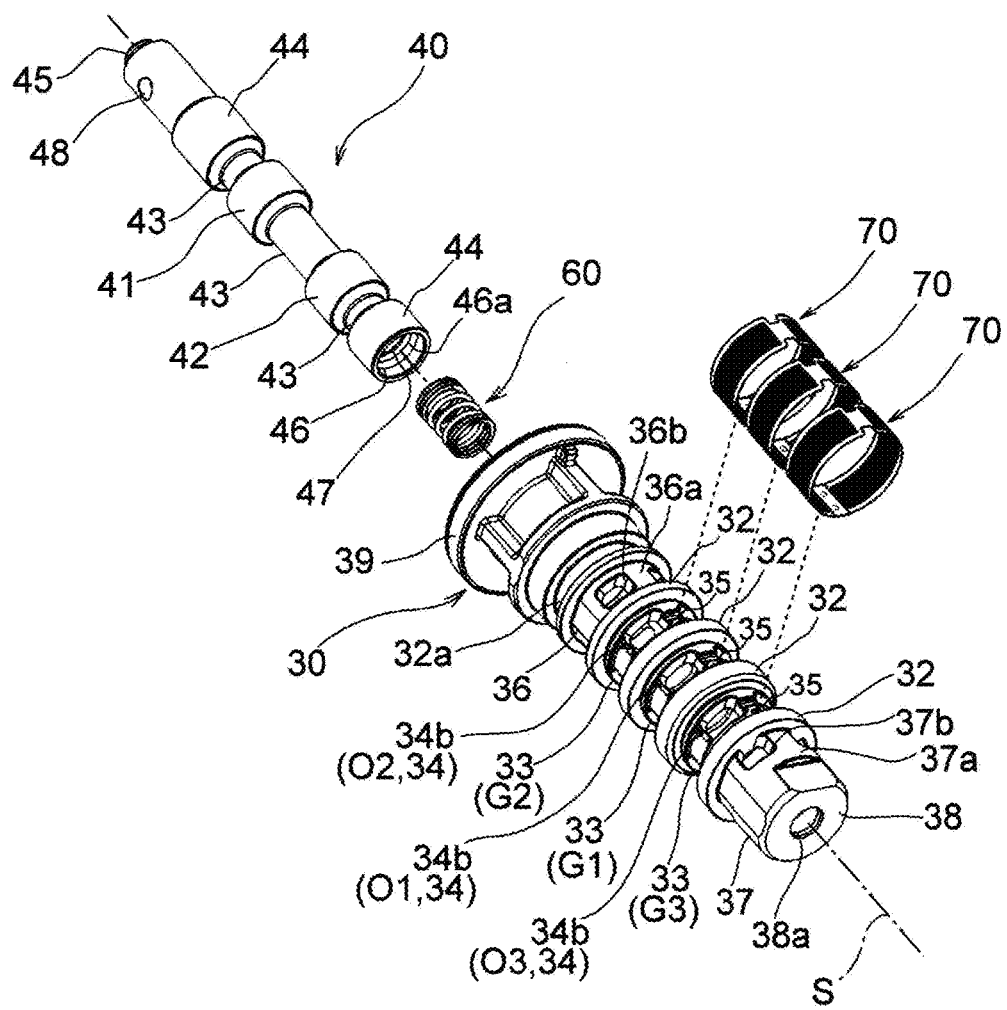
FIG. 5 is an exploded perspective view of a sleeve, a valve body, three filter members, and a biasing spring constituting a portion of a drive element, which are included in an oil passage control valve according to one embodiment.

As shown in FIG. 1, the oil passage control valve V is attached to the main body 1 of the engine E. As shown in FIG. 2, FIG. 3, and FIG. 5, the oil passage control valve V includes: a sleeve 30 of a substantially cylindrical shape, extending in an axis S direction; a valve body 40, extending in the axis S direction; an electromagnetic actuator 50 and a biasing spring 60, as a drive element; three filter members 70; and a seal member Sr.

The sleeve 30 is molded by a die using an aluminum material or the like. As shown in FIG. 6 to FIG. 10, the sleeve 30 includes: an internal passage 31; an outer peripheral surface 32; three annular grooves 33, an opening 34 and a protrusion 35, formed in a region of each of the three annular grooves 33; small diameter portions 36 and 37, having a smaller diameter than the outer peripheral surface 32; and a receiving part 38 and a flange 39, at both ends in the axis S direction.

The internal passage 31 functions as an oil passage through which hydraulic oil passes. The internal passage 31 includes an inner peripheral surface $31a$ formed by machining as a cylindrical surface centered on the axis S, and an inner peripheral surface $31b$ having a larger inner diameter than the inner peripheral surface $31a$. The inner peripheral surface $31a$ slidably receives the valve body 40 in the axis S direction. The inner peripheral surface $31b$ is formed by die molding in each of the three annular grooves 33, the small diameter portions 36 and 37, a region on the receiving part 38 side, and a region on the flange 39 side.

The outer peripheral surface 32 is formed by machining as a cylindrical surface centered on the axis S, so as to be fitted into the fitting hole $1a$ of the main body 1 of the engine E.

An annular seal groove $32a$ into which the seal member Sr is fitted is formed close to the flange 39 side on the outer peripheral surface 32.

The three annular grooves 33 are of the same shape, are arranged apart at substantially equal intervals in the axis S direction, and have a substantially rectangular shape defined by a bottom surface $33a$ and side surfaces $33b$ erected in a radial direction from both sides of the bottom surface $33a$ in a cross-section including the axis S. The bottom surface $33a$ is formed as a cylindrical surface having a predetermined outer diameter centered on the axis S; the side surfaces $33b$ are formed as annular flat surfaces erected in the radial direction from both sides of the bottom surface $33a$ in the axis S direction.

In a boundary region between the bottom surface $33a$ and the side surface $33b$ of the annular groove 33, an annular lightening portion $33c$ that is more recessed than the bottom surface $33a$ is formed.

Here, among the three annular grooves 33, the annular groove 33 located in the center in the axis S direction corresponds to a first annular groove G1, the annular groove 33 arranged on one side of the first annular groove G1 in the axis S direction corresponds to a second annular groove G2, and the annular groove 33 arranged on the other side of the first annular groove G1 in the axis S direction corresponds to a third annular groove G3.

The opening 34 is formed to penetrate in the radial direction to allow hydraulic oil to pass therethrough in the region of the three annular grooves 33.

Here, the opening 34 is formed by multiple (here, four) ports $34b$ that are arranged in a circumferential direction of the annular groove 33 with multiple partition walls $34a$ interposed therebetween and have an opening width D smaller than a width W of the annular groove 33 in the axis S direction.

The multiple partition walls $34a$ include: a first partition wall $34a_1$, on which the protrusion 35 is located in the circumferential direction of the annular groove 33; a second partition wall $34a_2$, overlapping a joint JP of the filter member 70 in the circumferential direction of the annular groove 33; and a third partition wall $34a_3$ and a fourth partition wall $34a_4$, located between the first partition wall $34a_1$ and the second partition wall $34a_2$ in the circumferential direction of the annular groove 33.

Here, the second partition wall $34a_2$ is formed at a position facing the first partition wall $34a_1$ in the radial direction of the annular groove 33, that is, at a position 180 degrees apart from the first partition wall $34a_1$ about the axis S.

Figure 9:
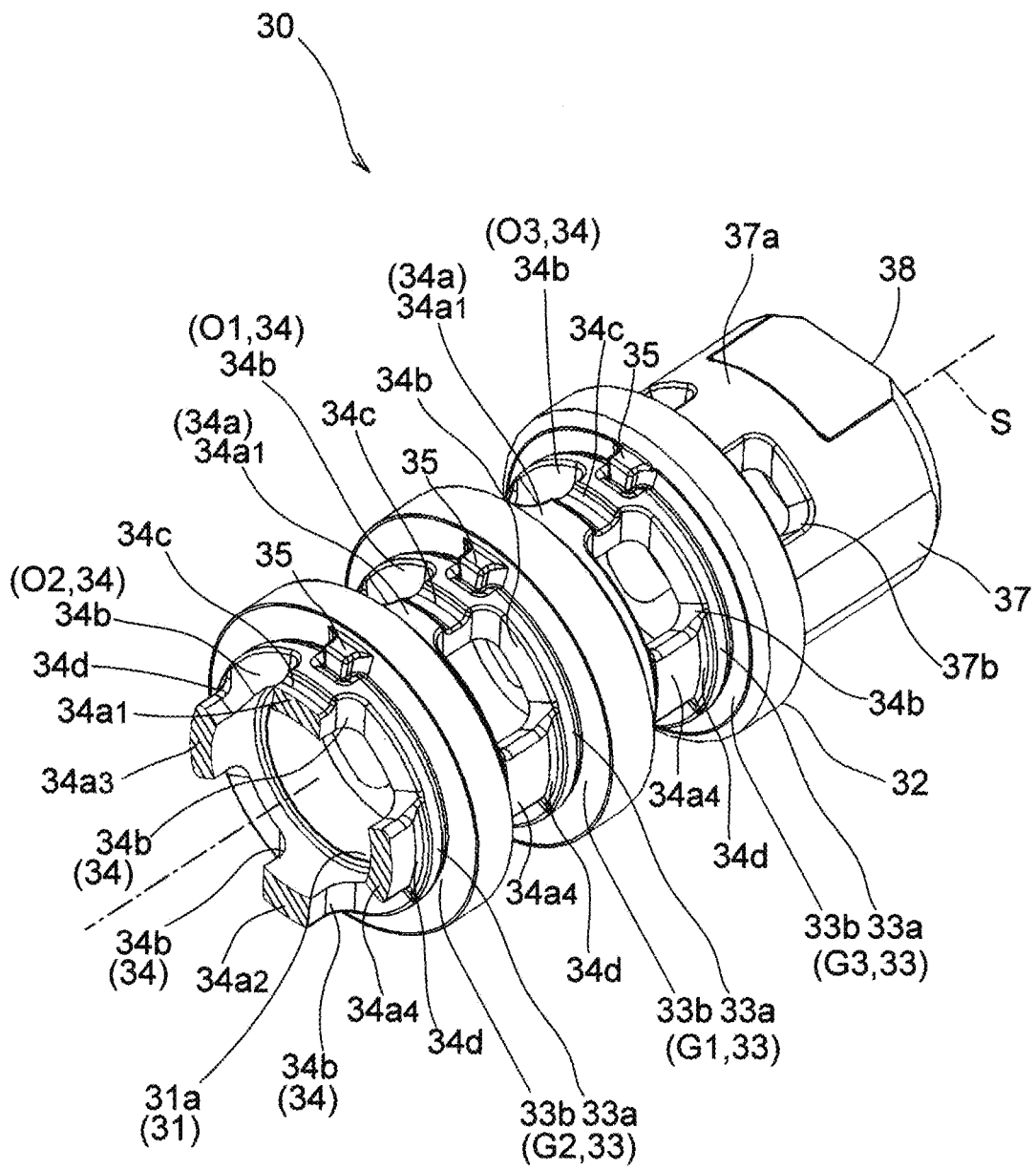
FIG. 9 is a perspective cross-sectional view of a sleeve included in an oil passage control valve according to one embodiment, cut along a plane perpendicular to an axis.
Figure 10:
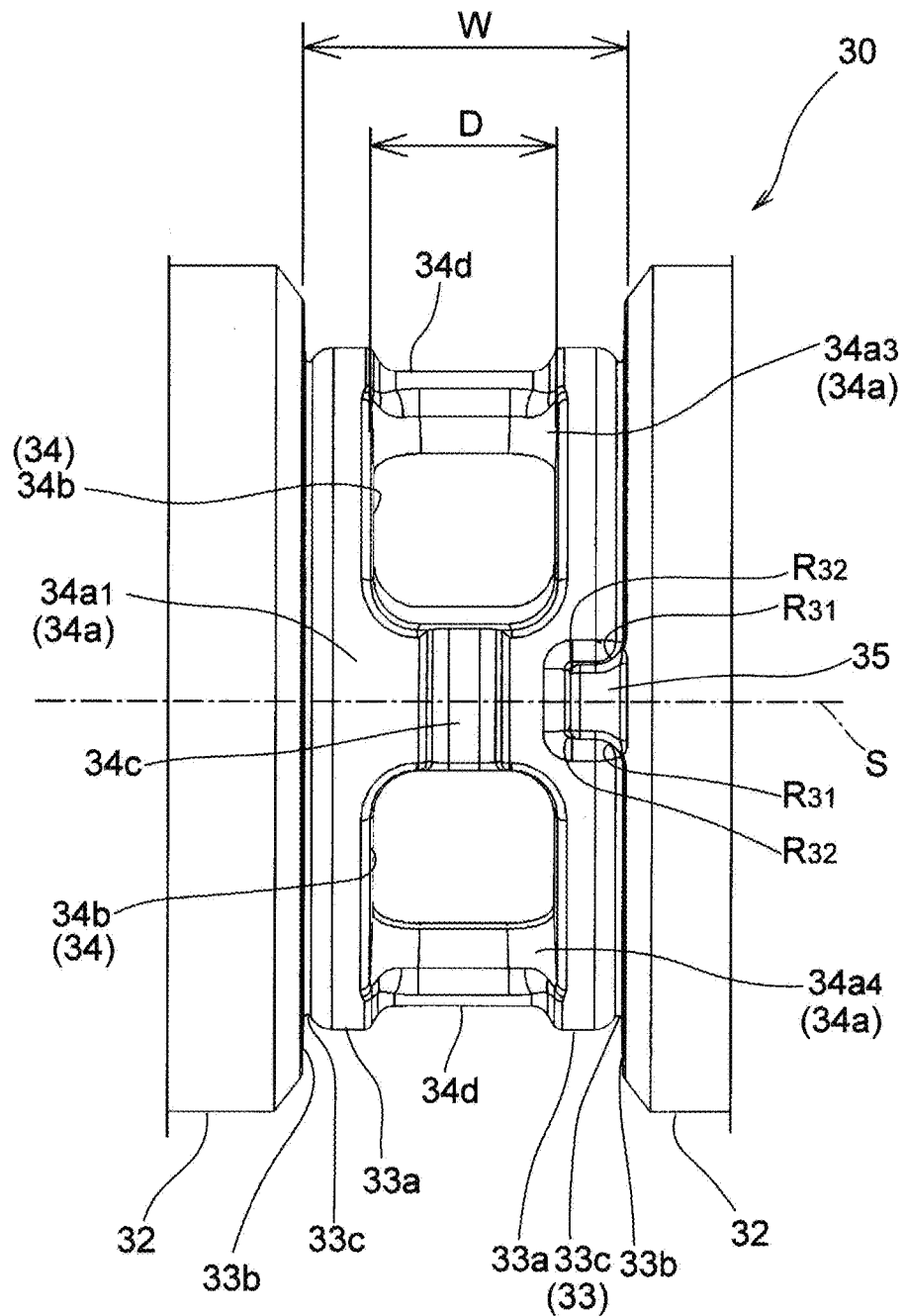
FIG. 10 is a partial plan view showing a region of one annular groove of a sleeve included in an oil passage control valve according to one embodiment.
Figure 16:
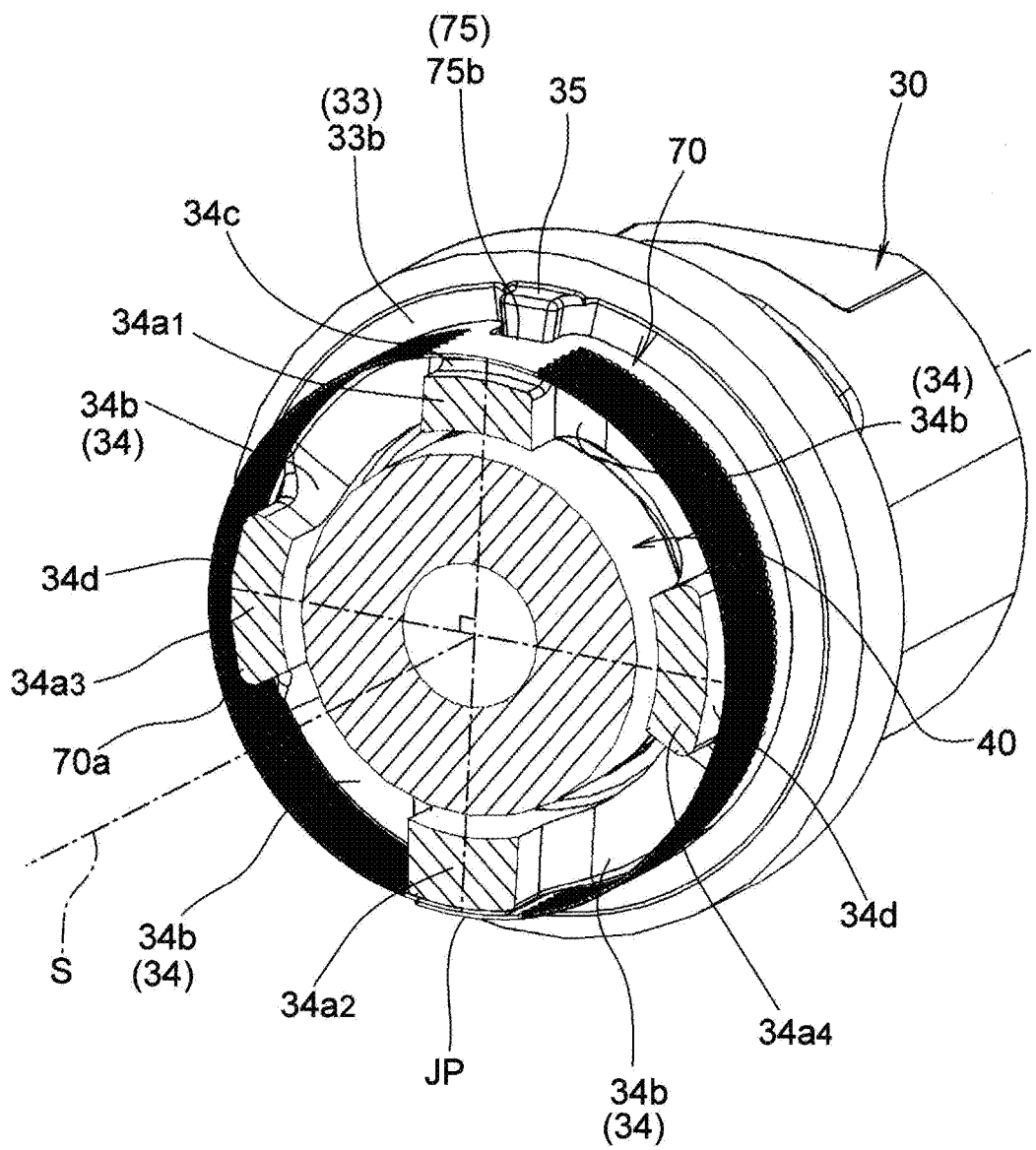
FIG. 16 is a perspective cross-sectional view cut along a plane including an axis in a region of one annular groove in an oil passage control valve according to one embodiment.

As shown in FIG. 9, FIG. 10, and FIG. 16, the first partition wall $34a_1$ is formed to include a narrow communication groove $34c$ that provides communication between adjacent ports $34b$ between the bottom surface $33a$ of the annular groove 33 and an inner peripheral surface $70a$ of the filter member 70.

Figure 7:
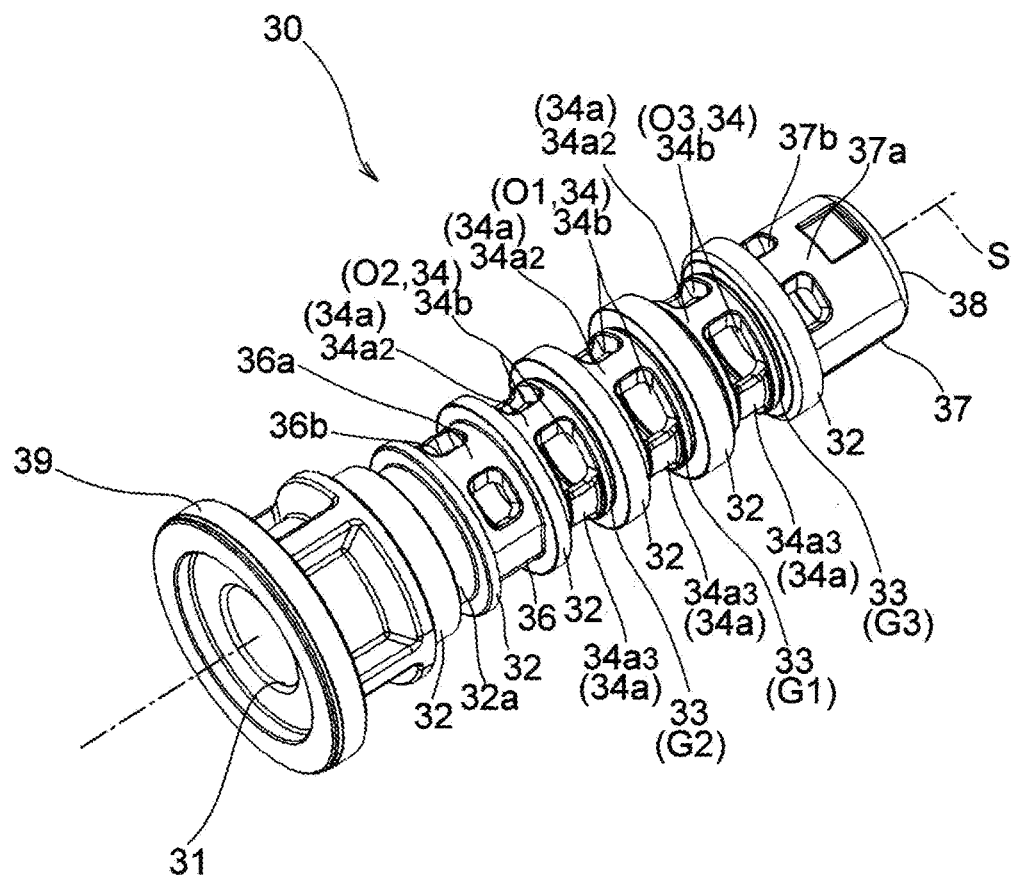
FIG. 7 is an external perspective view of the sleeve shown in FIG. 6, rotated 180 degrees about the axis.
Figure 8:
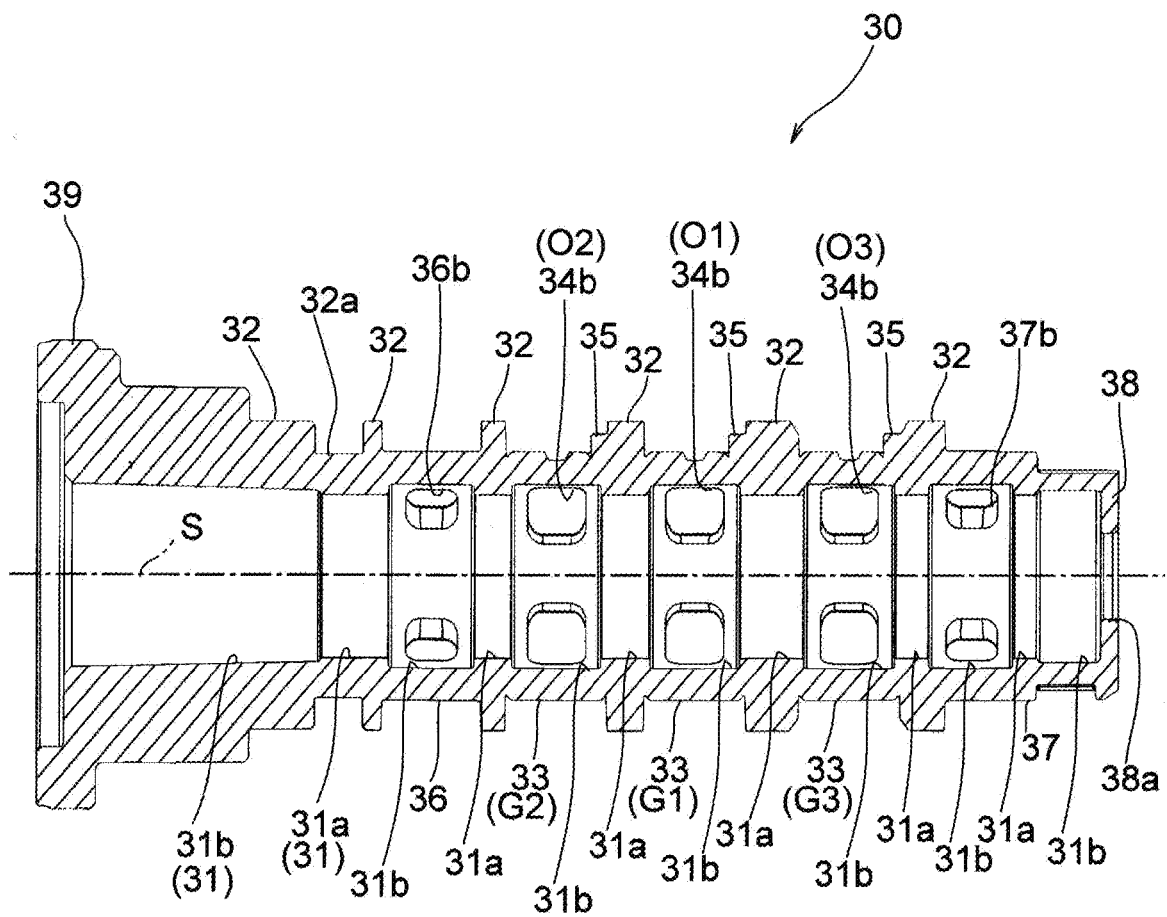
FIG. 8 is a cross-sectional view of a sleeve included in an oil passage control valve according to one embodiment, cut along a plane including an axis.

As shown in FIG. 7 and FIG. 16, the second partition wall $34a_2$ is formed to include an outer peripheral surface that is flush with the bottom surface $33a$ such that the bottom surface $33a$ of the annular groove 33 and the joint JP of the filter member 70 are in close contact.

As shown in FIG. 9, FIG. 10, and FIG. 16, the third partition wall $34a_3$ and the fourth partition wall $34a_4$ are formed to include a wide communication groove $34d$ that provides communication between adjacent ports $34b$ between the bottom surface $33a$ of the annular groove 33 and the inner peripheral surface $70a$ of the filter member 70.

That is, the multiple partition walls (first partition wall $34a_1$, third partition wall $34a_3$, and fourth partition wall $34a_4$), except for the second partition wall $34a_2$, each include the communication grooves $34c$ and $34d$ that provide communication between adjacent ports $34b$ among the multiple ports $34b$ between the bottom surface $33a$ of the annular groove 33 and the inner peripheral surface $70a$ of the filter member 70.

Figure 6:
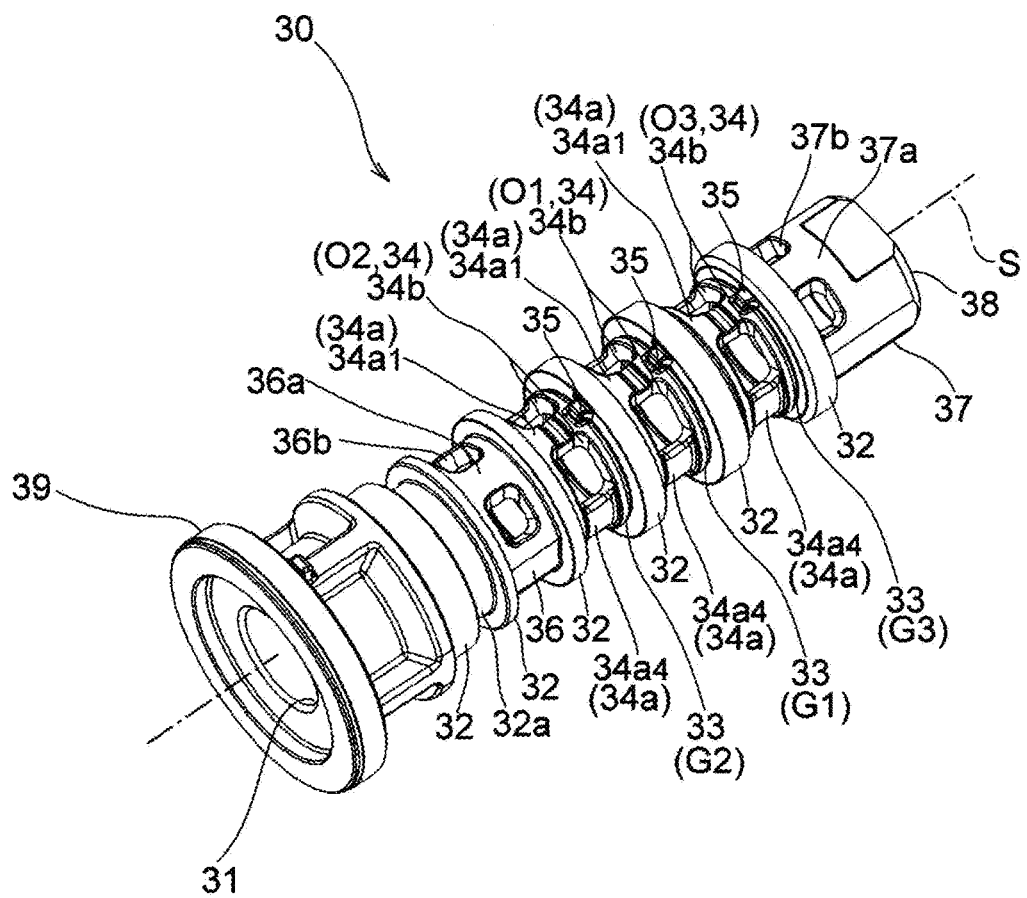
FIG. 6 is an external perspective view of a sleeve included in an oil passage control valve according to one embodiment, viewed obliquely from one direction.

As shown in FIG. 6, FIG. 7, and FIG. 9, the multiple (here, four) ports $34b$ are formed to each have a substantially rectangular opening and are arranged at substantially equal intervals about the axis S.

The multiple ports $34b$ formed in the first annular groove G1 correspond to a first opening O1 that supplies hydraulic oil into the sleeve 30. The multiple ports $34b$ formed in the second annular groove G2 correspond to a second opening O2 that communicates with the retard chamber RC as the first hydraulic chamber of the application target (valve timing varying device M). The multiple ports $34b$ formed in the third annular groove G3 correspond to a third opening O3 that communicates with the advance chamber AC as the second hydraulic chamber of the application target (valve timing varying device M).

In other words, the opening 34 includes the first opening O1 formed in the first annular groove G1, the second opening O2 formed in the second annular groove G2, and the third opening O3 formed in the third annular groove G3. The first opening O1 includes multiple ports $34b$ that supply hydraulic oil into the sleeve 30. The second opening O2 includes multiple ports $34b$ that communicate with the first hydraulic chamber (retard chamber RC) of the application target. The third opening O3 includes multiple ports $34b$ that communicate with the second hydraulic chamber (advance chamber AC) of the application target.

As shown in FIG. 6, and FIG. 8 to FIG. 10, the protrusion 35 is formed to protrude from the bottom surface $33a$ and side surface $33b$ of the annular groove 33, at a position offset from the opening 34 within the region of the three annular grooves 33.

The protrusion 35 is formed to have an overall convex rectangular shape, with a concave curved surface $R_{31}$ in a connection region with the side surface $33b$, and a convex curved surface $R_{32}$ in a tip region away from the side surface $33b$ in the axis S direction.

The protrusion 35 serves to engage with a notch 75 of the filter member 70 annularly wrapped around and fixed to the annular groove 33 and to position the filter member 70 in the circumferential direction of the annular groove 33

The small diameter portion 36 is formed in a region between the annular groove 33 (second annular groove G2)

and the annular seal groove 32a in the axis S direction. The small diameter portion 36 includes an outer peripheral surface 36a having a smaller diameter than the outer peripheral surface 32, and a discharge opening 36b opening in a region of the outer peripheral surface 36a.

The outer peripheral surface 36a has the same outer diameter as the bottom surface 33a of the three annular grooves 33.

The discharge opening 36b penetrates in the radial direction to allow hydraulic oil to pass therethrough, and is formed by four ports arranged at substantially equal intervals about the axis S and having a substantially rectangular opening.

That is, the discharge opening 36b is formed opposite to the first opening O1 (first annular groove G1) across the second opening O2 (second annular groove G2) in the axis S direction, and serves to discharge the hydraulic oil that has flowed into the internal passage 31 from the second opening O2 to the outside of the sleeve 30.

The small diameter portion 37 is formed in a region between the annular groove 33 (third annular groove G3) and the receiving part 38 in the axis S direction. The small diameter portion 37 includes an outer peripheral surface 37a having a smaller diameter than the outer peripheral surface 32, and a discharge opening 37b opening in a region of the outer peripheral surface 37a.

The outer peripheral surface 37a has the same outer diameter as the bottom surface 33a of the three annular grooves 33.

The discharge opening 37b penetrates in the radial direction to allow hydraulic oil to pass therethrough, and is formed by four ports arranged at substantially equal intervals about the axis S and having a substantially rectangular opening.

That is, the discharge opening 37b is formed opposite to the first opening O1 (first annular groove G1) across the third opening O3 (third annular groove G3) in the axis S direction, and serves to discharge the hydraulic oil that has flowed into the internal passage 31 from the third opening O3 to the outside of the sleeve 30.

The receiving part 38 is formed in a disc shape at one end in the axis S direction and is formed to receive one end of the biasing spring 60 housed inside the sleeve 30. The receiving part 38 includes a circular hole 38a for adjusting pressure of the valve body 40 on the axis S. Accordingly, the valve body 40 is able to move smoothly between a rest position and an operating position.

The flange 39 is for connecting the electromagnetic actuator 50, and is formed in an annular shape at the other end in the axis S direction. The flange 39 is integrally fixed with the electromagnetic actuator 50 by caulking a cylindrical member 56 of the electromagnetic actuator 50.

As shown in FIG. 3, FIG. 5, FIG. 19, and FIG. 21, the valve body 40 is formed in a cylindrical shape extending in the axis S direction to be slidably inserted into the inner peripheral surface 31a of the sleeve 30. The valve body 40 includes a first valve part 41, a second valve part 42, a small diameter portion 43, a guided part 44, a contact part 45, a spring housing 46, an internal passage 47, and an opening 48.

The first valve part 41 is formed to define a cylindrical surface centered on the axis S, and slides along the inner peripheral surface 31a of the sleeve 30 and opens and closes an oil passage between the first opening O1 and the second opening O2. The first valve part 41 also functions as a guided part that is guided in the axis S direction by the inner peripheral surface 31a of the sleeve 30.

The second valve part 42 is formed in the same shape as the first valve part 41, and slides along the inner peripheral surface 31a of the sleeve 30 and opens and closes an oil passage between the first opening O1 and the third opening O3. The second valve part 42 also functions as a guided part that is guided in the axis S direction by the inner peripheral surface 31a of the sleeve 30.

The small diameter portion 43 is formed in a columnar shape having a smaller outer diameter than the first valve part 41 and the second valve part 42, and is formed to define an oil passage for hydraulic oil between itself and the inner peripheral surfaces 31a and 31b of the sleeve 30.

The guided part 44 is formed to define a cylindrical surface having the same outer diameter as the first valve part 41 and the second valve part 42, so as to be guided in the axis S direction by the inner peripheral surface 31a of the sleeve 30.

The contact part 45 is formed as a flat surface at an end in the axis S direction, and is engaged with a drive shaft 58b of the electromagnetic actuator 50, such that a driving force is applied thereto against a biasing force of the biasing spring 60.

The spring housing 46 includes a receiving part 46a that receives the other end of the biasing spring 60, and houses the biasing spring 60 in a manner that allows free expansion and contraction of the biasing spring 60 in the axis S direction.

The internal passage 47 and the opening 48 serve to, when the valve body 40 reciprocates in the axis S direction, adjust the pressure within a space located at both ends of the valve body 40 and smooth the movement of the valve body 40.

Figure 4:
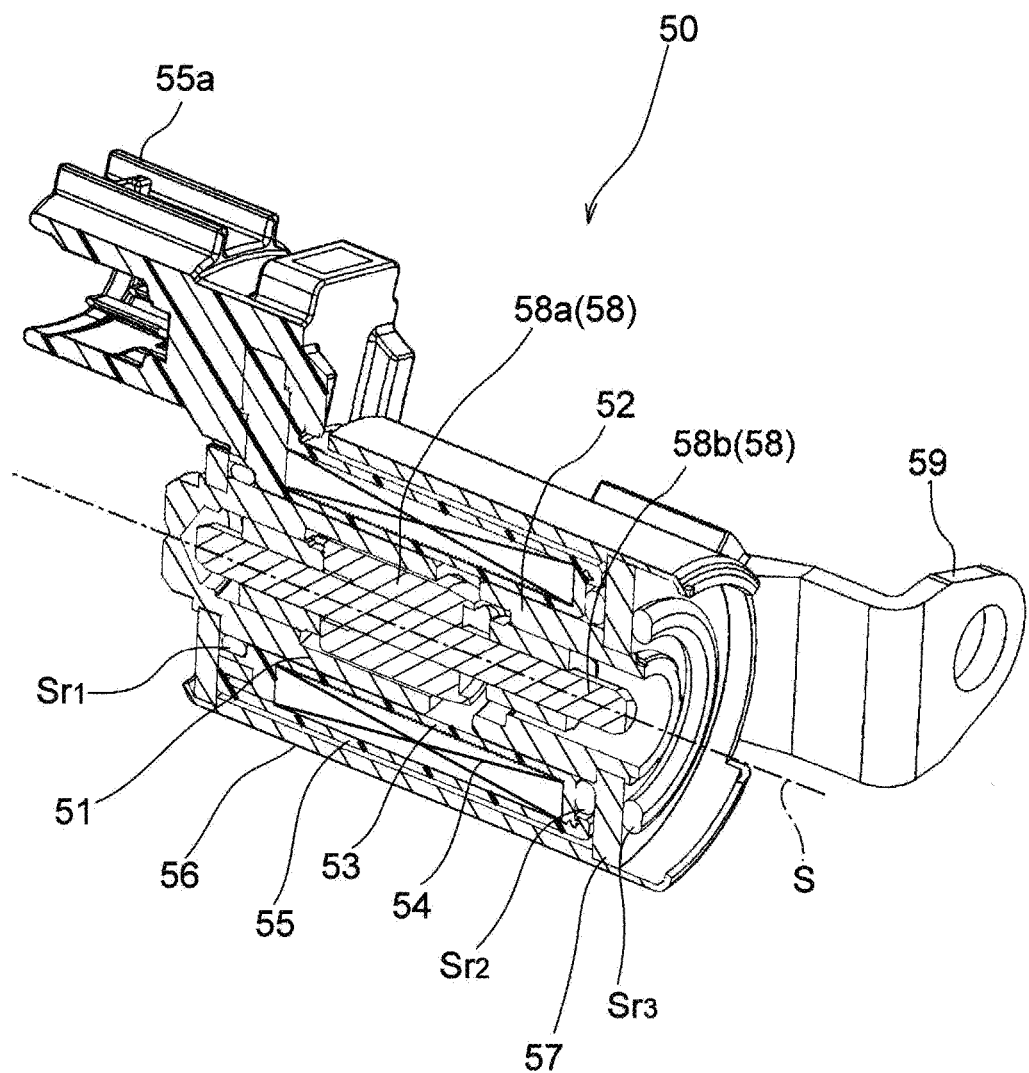
FIG. 4 is a perspective cross-sectional view of an electromagnetic actuator constituting a portion of a drive element included in an oil passage control valve according to one embodiment.

As shown in FIG. 2 to FIG. 4, the electromagnetic actuator 50 includes: a first stator 51 and a second stator 52, forming a magnetic path; a bobbin 53; a coil 54 for excitation; a resin cover member 55, having the bobbin 53 and the coil 54 embedded therein and including a connector 55a; the cylindrical member 56 and a flat plate member 57, forming a magnetic path; a mover 58; a mounting bracket 59, fixed to the cylindrical member 56; and annular seal members $Sr_1$, $Sr_2$, and $Sr_3$.

The cylindrical member 56 is formed into a cylindrical shape centered on the axis S by machining such as cutting and rolling using an iron plate made of soft iron or the like. The cylindrical member 56 is subjected to caulking to join and fix the flange 39 of the sleeve 30 to the flat plate member 57.

The mover 58 is composed of a plunger 58a and a drive shaft 58b fixed to the plunger 58a.

The plunger 58a functions as a magnetic path through which a line of magnetic force passes, and also functions as a movable iron core that moves in the axis S direction when current is applied to the coil 54.

The drive shaft 58b contacts the contact part 45 of the valve body 40 and exerts a driving force. The drive shaft 58b is formed into an elongated columnar shape in the axis S direction using, for example, a non-magnetic material such as stainless steel.

In the electromagnetic actuator 50, when current is applied to the coil 54, the mover 58 (drive shaft 58b) moves in the axis S direction against the biasing force of the biasing spring 60 and causes the valve body 40 to move toward the operating position; when the current to the coil 54 is cut off, the mover 58 is returned to the rest position together with the valve body 40 by the biasing force of the biasing spring 60.

The biasing spring 60 is a compression-type coil spring. The biasing spring 60 is housed in the internal passage 31 of the sleeve 30, and is assembled such that one end contacts the receiving part 38 of the sleeve 30 and the other end contacts the receiving part 46a of the spring housing 46 of the valve body 40.

Figure 19:
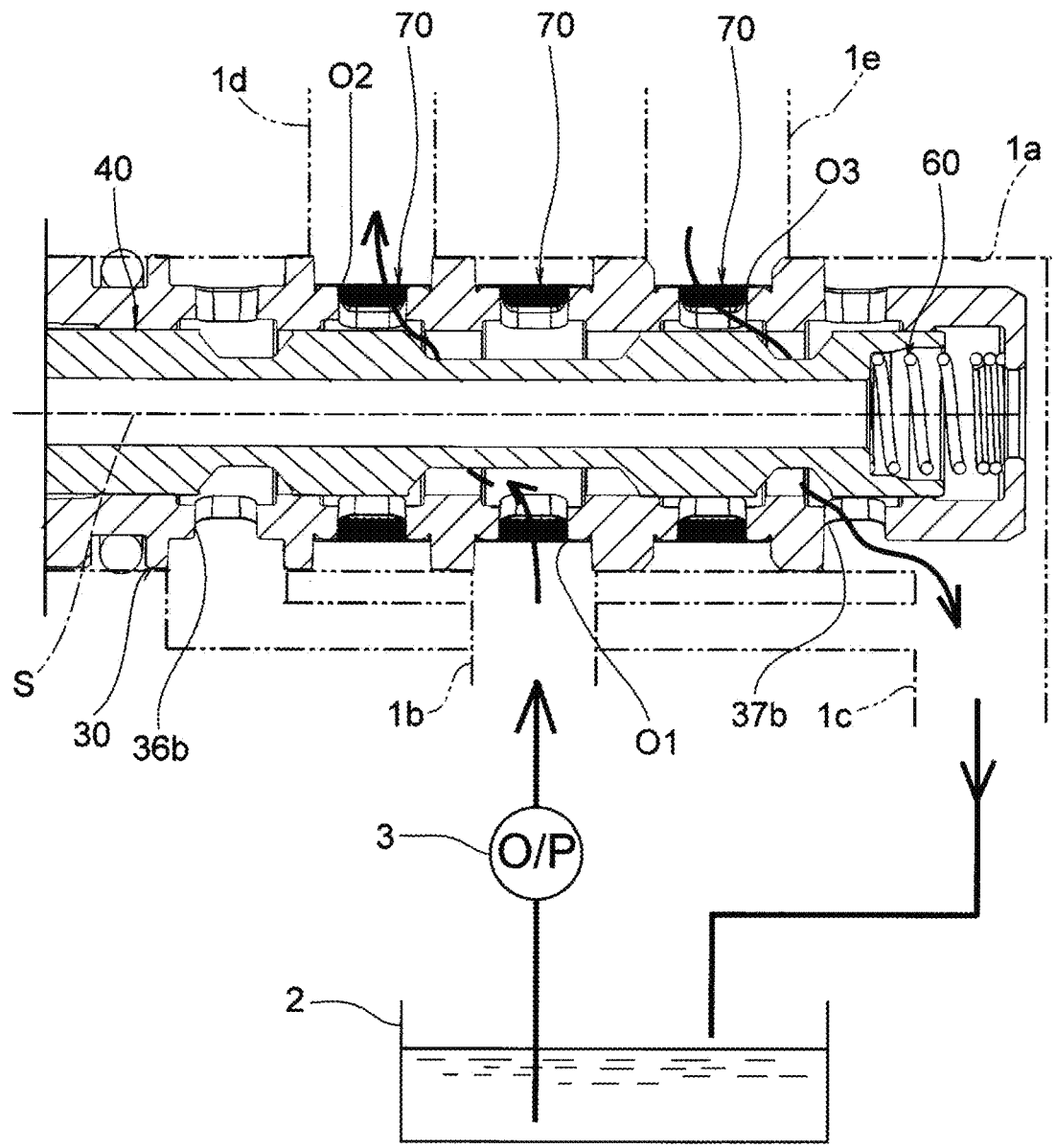
FIG. 19 is a state diagram showing a state in an oil passage control valve according to one embodiment, in which a valve body is at a rest position and hydraulic oil may be supplied to a retard chamber of a valve timing varying device as an application target.

As shown in FIG. 19, the biasing spring 60 exerts a biasing force that biases the valve body 40 toward the rest position where the first valve part 41 opens the oil passage between the first opening O1 and the second opening O2, that is, toward the drive shaft 58b of the electromagnetic actuator 50.

The filter member 70 is formed by punching or etching of a thin stainless steel plate having a plate thickness T.

Figure 11:
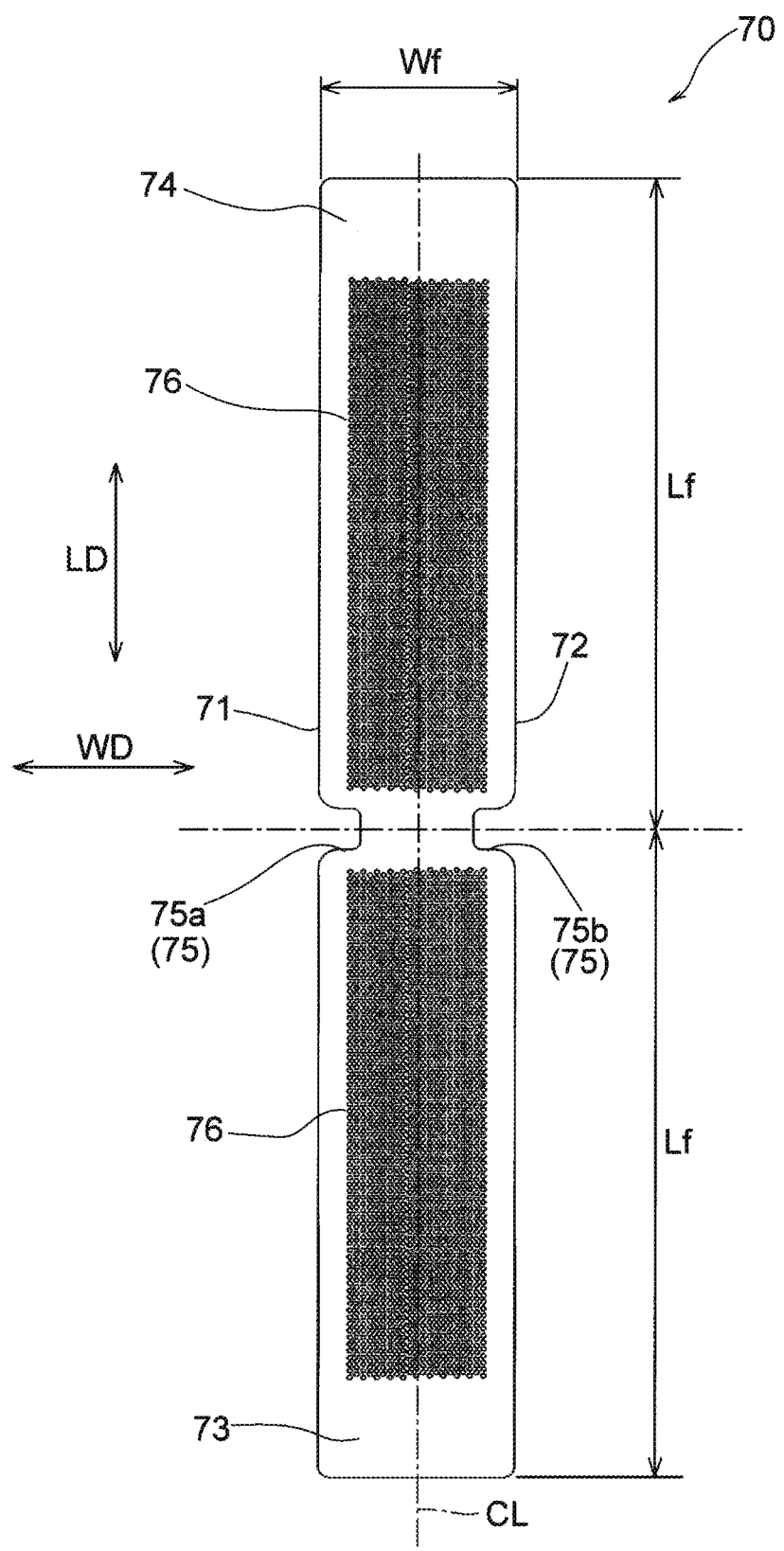
FIG. 11 is a plan view of a filter member included in an oil passage control valve according to one embodiment, expanded into a strip-like shape before assembly.

As shown in FIG. 11, in a state before assembly, the filter member 70 is of a strip-like shape having a length dimension 2Lf in a longitudinal direction LD and a width dimension Wf in a width direction WD. The filter member 70 includes one side part 71, other side part 72, one end region 73 and other end region 74, the notch 75, and a filtration part 76.

Here, the width dimension Wf of the filter member 70 is set to be slightly smaller than the width W of the annular groove 33 of the sleeve 30 in the axis S direction and sufficiently larger than the opening width D of the port 34b. The length dimension 2Lf of the filter member 70 is set as a dimension larger than an outer circumferential length of the bottom surface 33a forming the cylindrical surface of the annular groove 33, such that, in a state in which the filter member 70 is wrapped around the annular groove 33, the one end region 73 and the other end region 74 overlap each other to form the joint JP.

Figure 12:
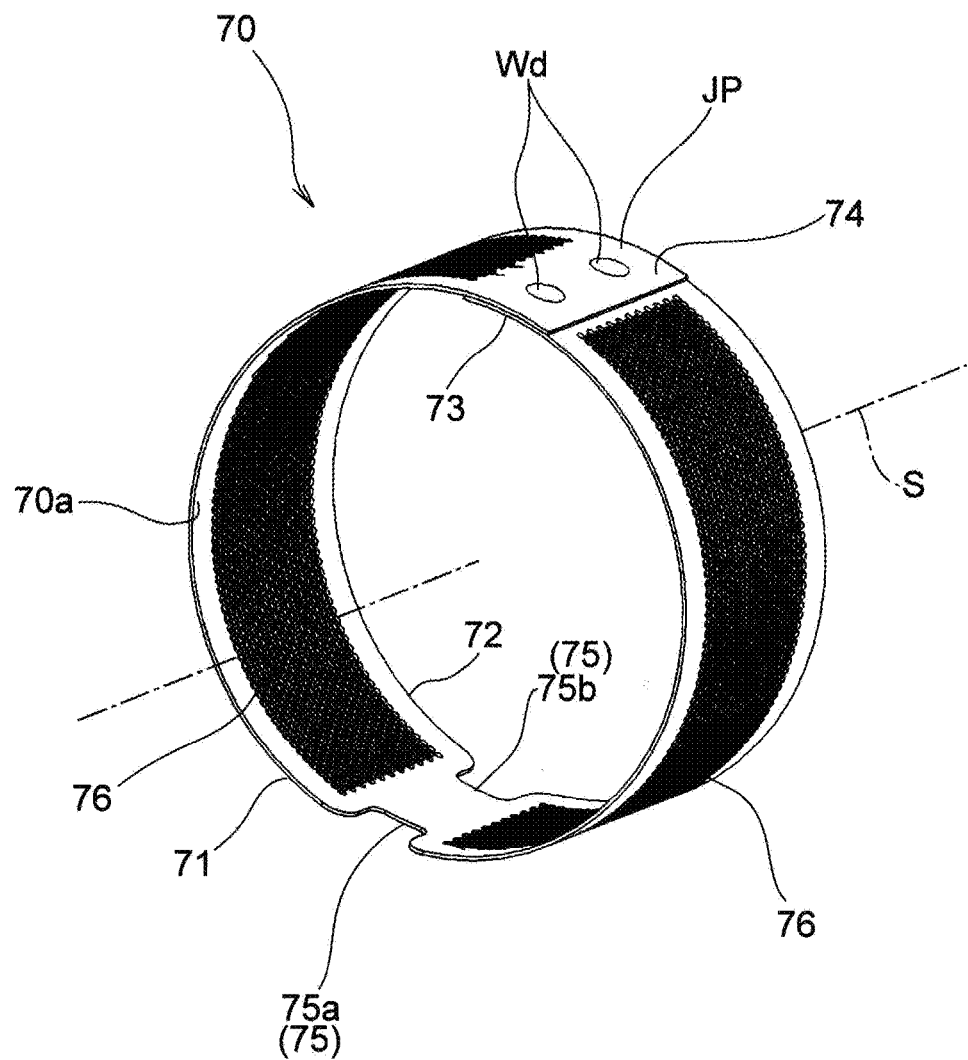
FIG. 12 is a perspective view showing a state in which a filter member included in an oil passage control valve according to one embodiment is formed into an annular shape and joined.
Figure 13:
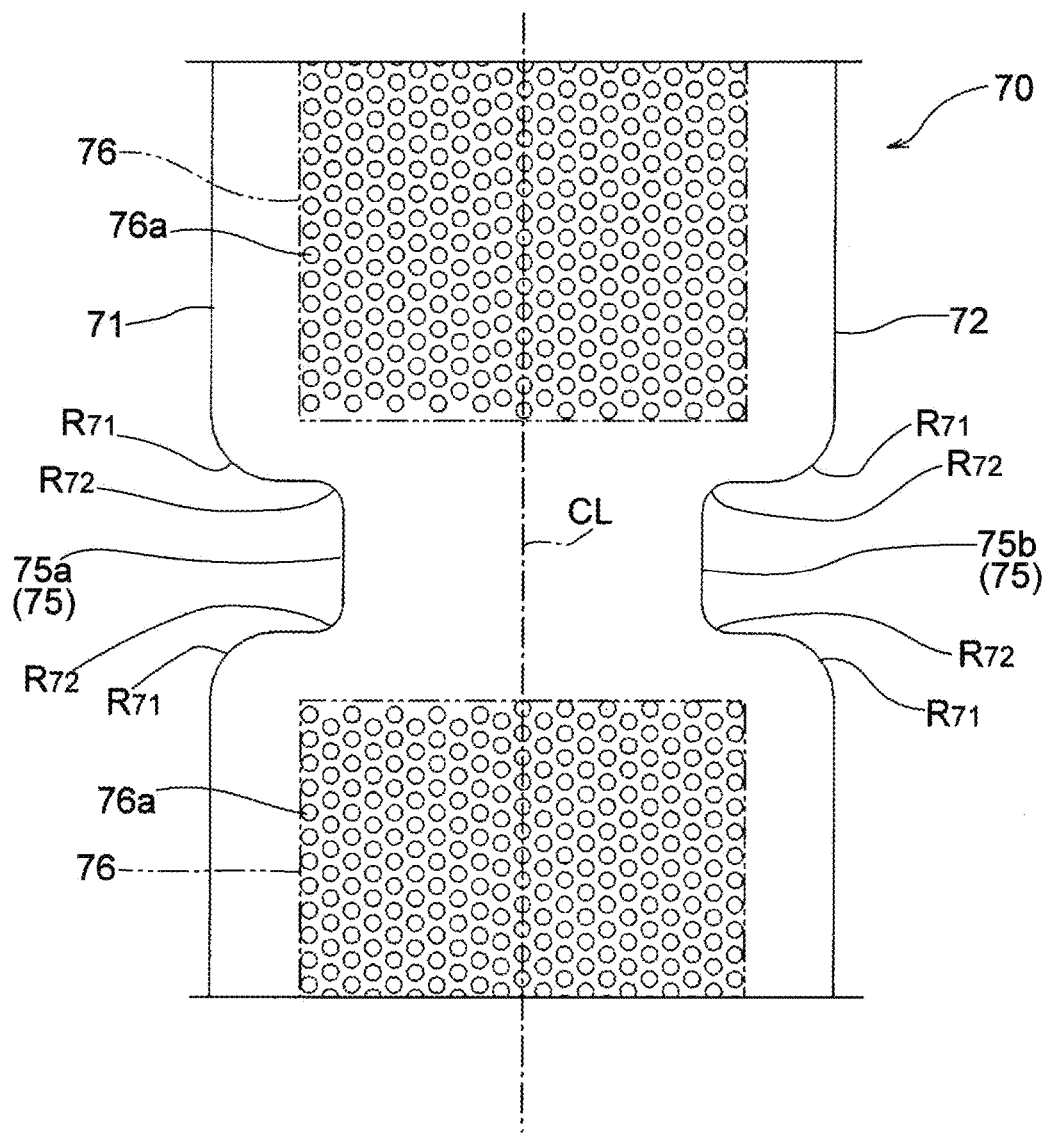
FIG. 13 is a partial plan view partially showing a region including a notch of a filter member included in an oil passage control valve according to one embodiment.

As shown in FIG. 2 and FIG. 12, the one end region 73 and the other end region 74 form the joint JP in a state of being annularly wrapped around the annular groove 33 of the sleeve 30 and fixed by welding Wd.

The notch 75 is engaged with the protrusion 35 of the sleeve 30. As shown in FIG. 11, the notch 75 is formed to include, in the one side part 71 and the other side part 72 (that is, both side parts) in the width direction WD, a first notch 75a and a second notch 75b that are formed line-symmetrically with respect to a center line CL in the longitudinal direction LD.

The notch 75 is formed in the center of the filter member 70 in the longitudinal direction LD. That is, the filter member 70 is formed with the same length Lf from the notch 75 as the center to both ends in the longitudinal direction LD.

Figure 15:
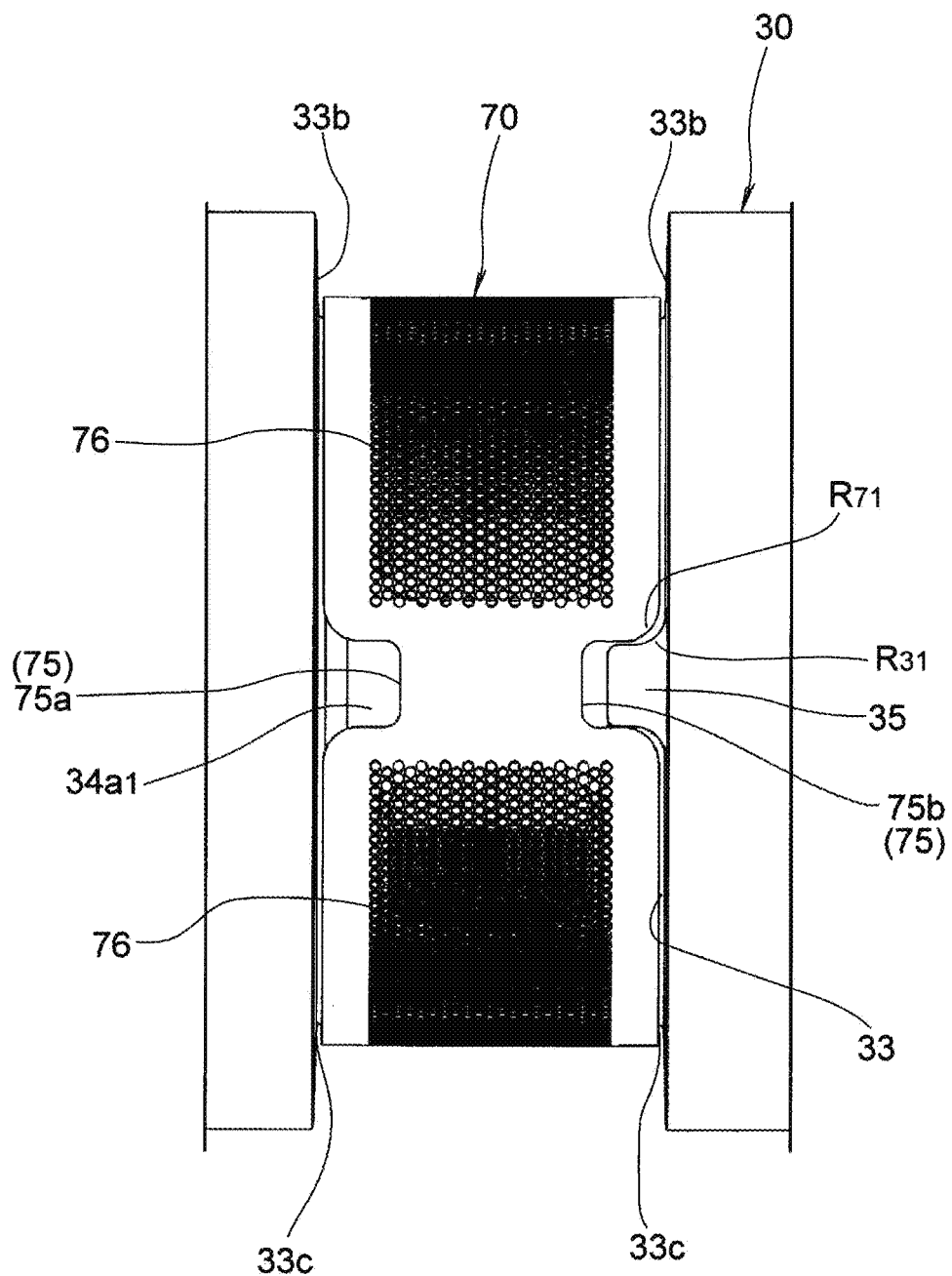
FIG. 15 is a partial plan view showing a filter member wrapped around one annular groove of a sleeve in an oil passage control valve according to one embodiment.

Here, the notch 75 (first notch 75a and second notch 75b) is formed in a concave rectangular shape such that the convex-rectangular-shaped protrusion 35 of the sleeve 30 is fitted thereto. A convex curved part $R_{71}$ and a concave curved part $R_{72}$ are formed in a corner region. As shown in FIG. 15, the convex curved part $R_{71}$ is formed to have a larger radius of curvature than the concave curved surface $R_{31}$ of the protrusion 35. Accordingly, the notch 75 is smoothly engaged with the protrusion 35.

The filtration part 76 is arranged on both sides of the notch 75 in the longitudinal direction LD, has a substantially rectangular outline and is formed as an aggregate of multiple filtration holes 76a.

Figure 14:
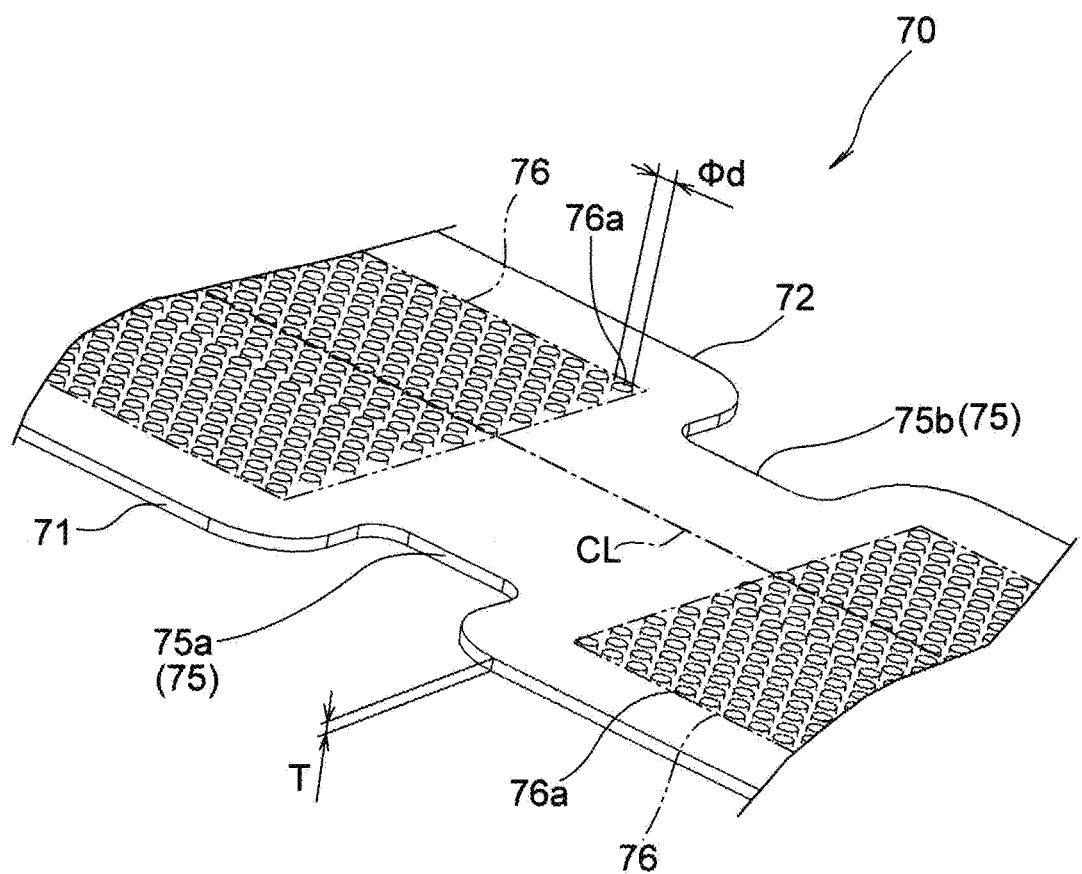
FIG. 14 is a partial perspective view partially showing a region including a notch of a filter member included in an oil passage control valve according to one embodiment.

As shown in FIG. 14, the filtration hole 76a of the filtration part 76 is formed as a circular hole having a diameter φd by etching.

The substantially rectangular outline of the filtration part 76 is formed to be equal to or slightly larger than the width dimension of the opening 34 (port 34b) formed in the annular groove 33.

The diameter φd of the filtration hole 76a is larger than the plate thickness T of the filter member 70. Here, the diameter od is approximately twice as large as the plate thickness T (φd=2T). For example, in the case where the plate thickness T of the stainless steel plate forming the filter member 70 is 0.1 mm, the diameter od of the filtration hole 76a can be 0.2 mm.

As shown in FIG. 15, the filter member 70 having the above configuration is assembled such that one of the first notch 75a and the second notch 75b is engaged with the protrusion 35 when the filter member 70 is annularly wrapped around and fixed to the annular groove 33 of the sleeve 30.

That is, since the notch 75 includes two notches (first notch 75a and second notch 75b) formed line-symmetrically with respect to the center line CL, when the filter member 70 is wrapped, assembly is possible even if the filter member 70 has its front and back reversed or has its left and right reversed in the axis S direction, and the assembly operation can be smoothly performed.

In the state in which the filter member 70 is annularly wrapped around and fixed to the annular groove 33, as shown in FIG. 16, except for the second partition wall $34a_2$, communication grooves 34c and 34d that provide communication between adjacent ports 34b are formed between the inner peripheral surface 70a of the filter member 70 and each of the first partition wall $34a_1$, the third partition wall $34a_3$, and the fourth partition wall $34a_4$.

Accordingly, the passage area when the hydraulic oil flows through the filter member 70 can be increased, and flow resistance can be reduced.

On the other hand, an outer peripheral surface of the second partition wall $34a_2$ is formed flush with the bottom surface 33a of the annular groove 33, allowing the joint JP of the filter member 70 to be in close contact. Accordingly, when the one end side region 73 and the other end side region 74 overlap each other and are subjected to welding (for example, laser welding) while being pressed, the pressing force can be withstood, and the welding operation can be reliably performed.

Figure 17:
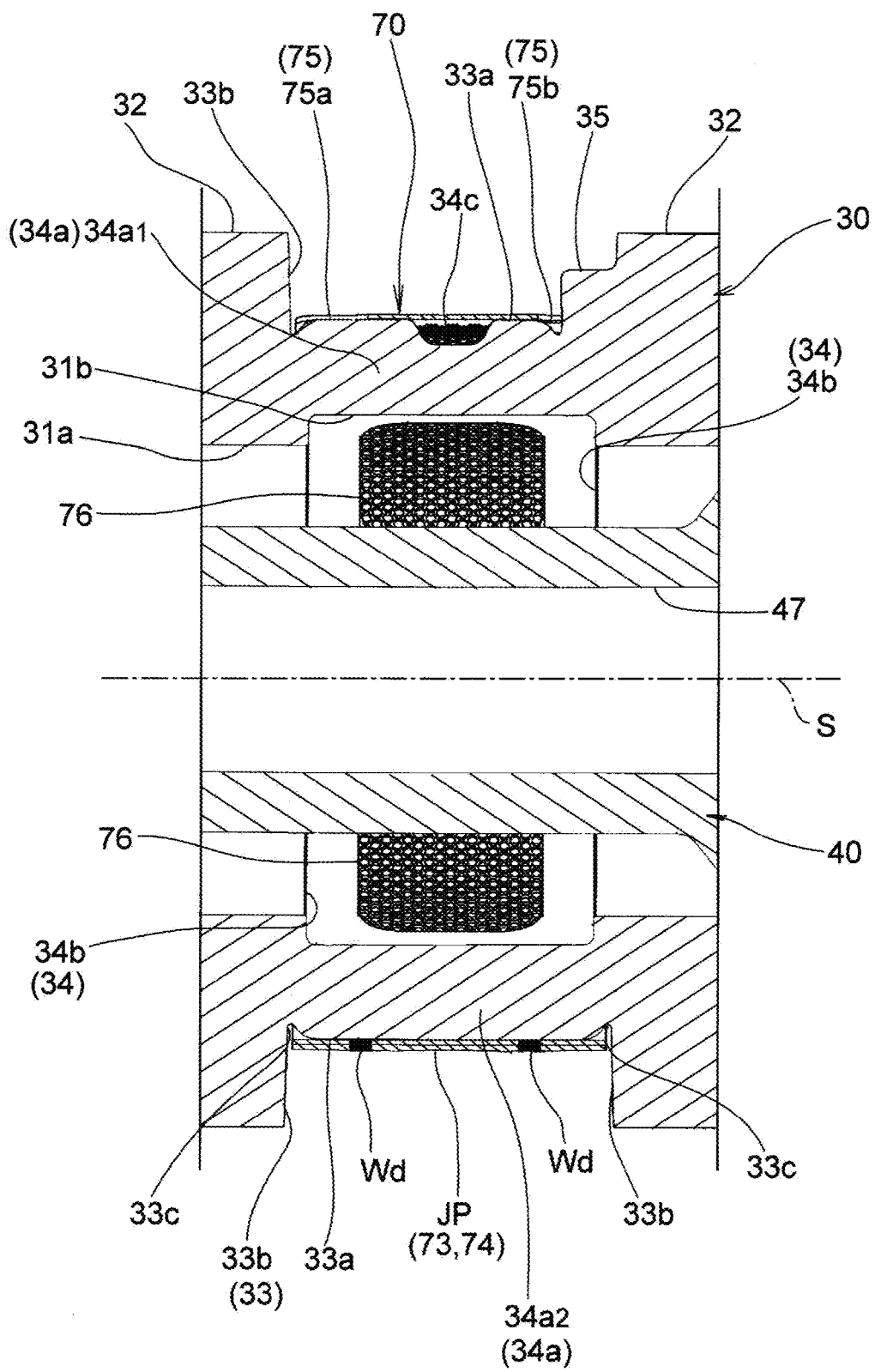
FIG. 17 is a cross-sectional view of a region of one annular groove of an oil passage control valve according to one embodiment, cut along a plane including an axis.

In the state in which the filter member 70 is annularly wrapped around and fixed to the annular groove 33, as shown in FIG. 17, the one side part 71 and the other side part 72 of the filter member 70 may face the annular lightening portion 33c formed in the boundary region between the bottom surface 33a and the side surface 33b of the annular groove 33.

If the above boundary region is formed as a curved surface (corner R) raised from the bottom surface 33a, there is a risk that the filter member 70 may ride up on the curved surface of the boundary region and not adhere closely to the bottom surface 33a when wrapped with deviation in the axis S direction. Here, since the above boundary region is formed as the annular lightening portion 33c rather than the bottom surface 33a, the filter member 70 can be made to adhere closely to the bottom surface 33a, ensuring the sealing property of regions other than the filtration part 76.

Figure 18:
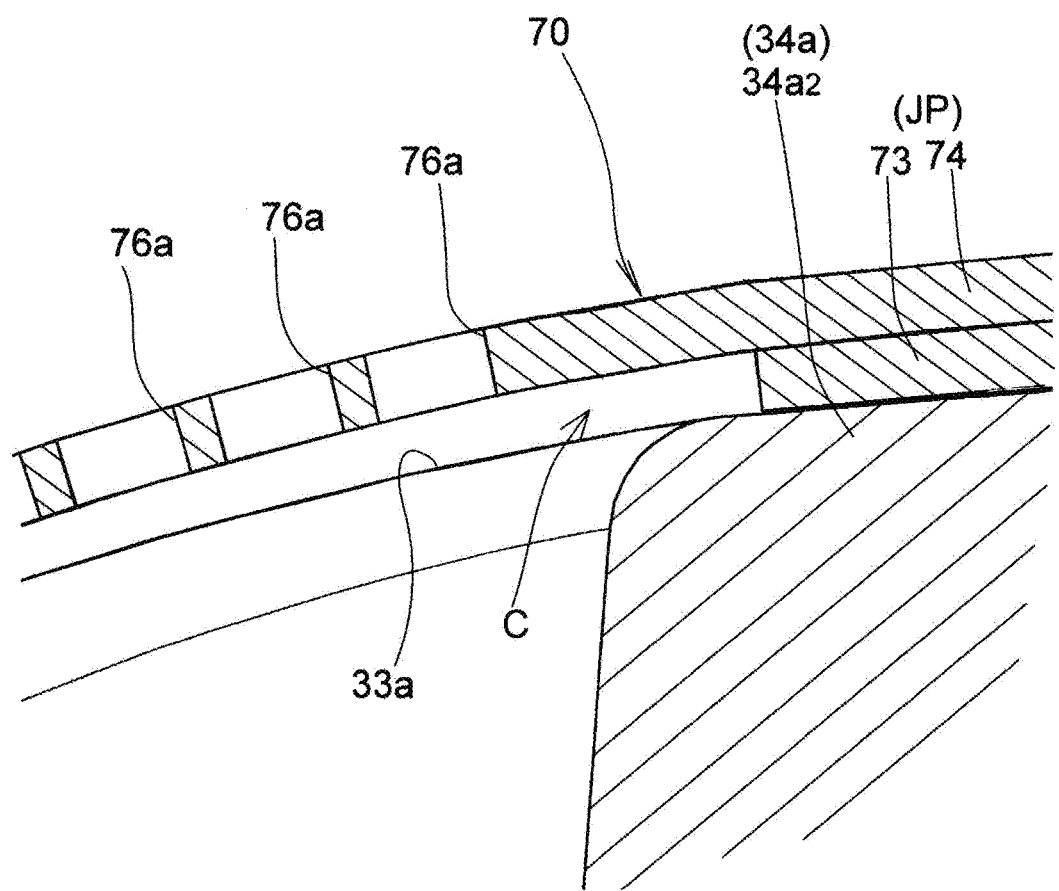
FIG. 18 is an enlarged cross-sectional view partially enlarging and showing a region of a joint of a filter member in an oil passage control valve according to one embodiment.

In the state in which the filter member 70 is annularly wrapped around and fixed to the annular groove 33, as shown in FIG. 18, in a region in the vicinity of the joint JP where the one end side region 73 and the other end side region 74 overlap and are joined, a gap C that gradually decreases from the plate thickness T of the filter member 70 is formed between the inner peripheral surface 70a of the filter member 70 and the bottom surface 33a of the annular groove 33.

Here, since the plate thickness T is smaller than the diameter od of the filtration hole 76a of the filter member 70, the gap C is smaller than the diameter od of the filtration hole 76a. Accordingly, even if the gap C is formed, foreign matter being a filtration target can be prevented from entering through the gap C.

The seal member Sr is a rubber O-ring, which is fitted into the annular seal groove 32a of the sleeve 30 to seal between the main body 1 of the engine E and the sleeve 30.

Next, an operation of the valve timing varying device M using the oil passage control valve V having the above configuration will be described with reference to FIG. 19 to FIG. 22.

First, in a stopped state of the engine E, the oil passage control valve V is in a rest state. At this time, as shown in FIG. 19, the valve body 40 is biased in one direction by the biasing force of the biasing spring 60, with the first valve part 41 in an open valve state that opens the oil passage between the first opening O1 (port 34b) and the second opening O2 (port 34b), and the second valve part 42 in a closed valve state that closes the oil passage between the first opening O1 (port 34b) and the third opening O3 (port 34b). At this time, the retard chamber RC is in a state in which hydraulic oil is supplied, and the advance chamber AC is in a state in which hydraulic oil is discharged.

In the stopped state of the engine E, a valve timing is held at a retard position (here, the most retarded position), as shown in FIG. 20. Here, in the stopped state of the engine E, the valve timing may be held at the retard position by a locking mechanism (not shown). When the engine E transitions to the stopped state from a state in which the valve timing is between an intermediate position and an advance position during operation of the engine E, the valve timing automatically returns to the retard position due to fluctuating torque and friction torque transmitted from the camshaft 4.

Figure 21:
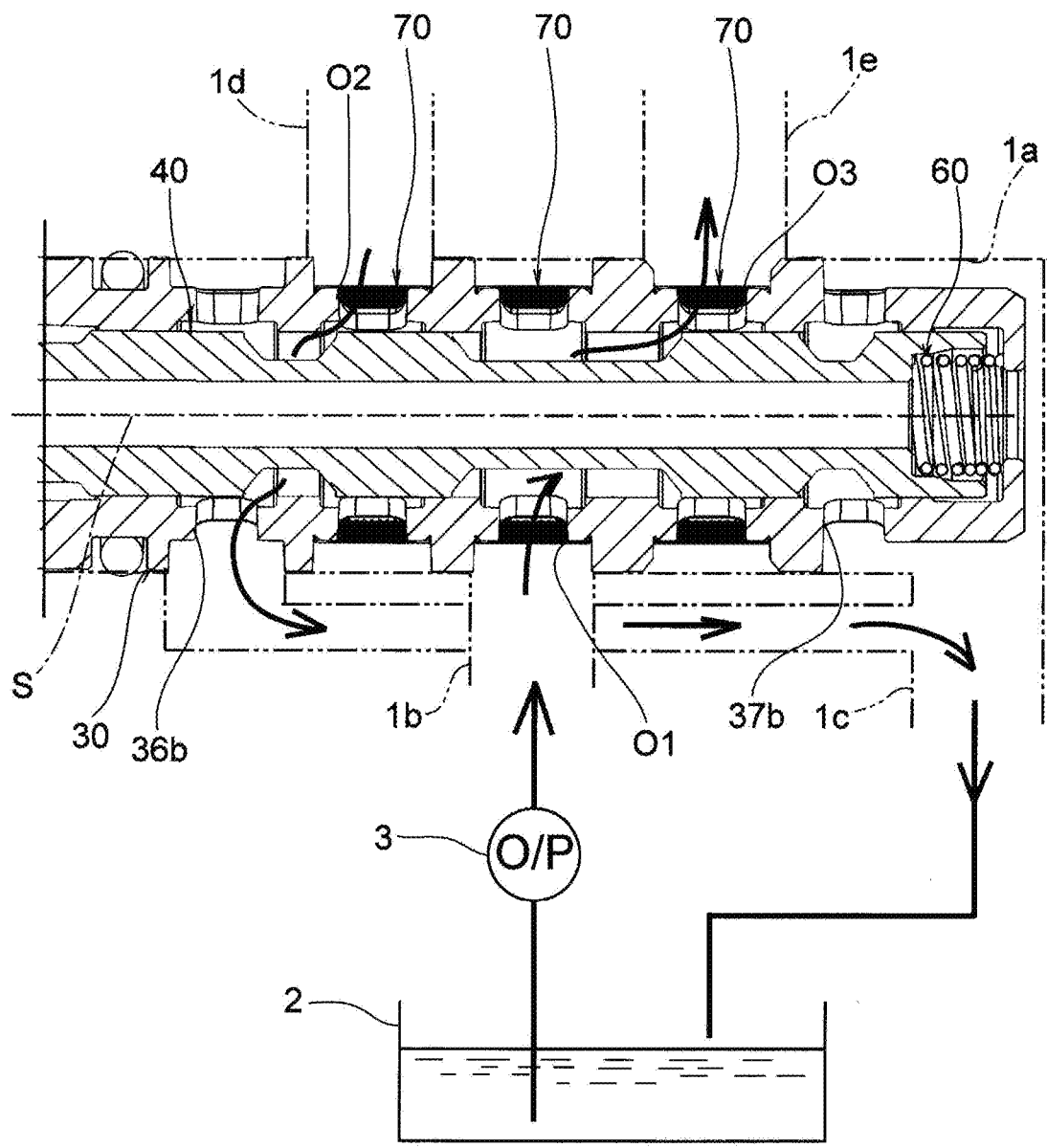
FIG. 21 is a state diagram showing a state in an oil passage control valve according to one embodiment, in which a valve body is at an operating position and hydraulic oil may be supplied to an advance chamber of a valve timing varying device as an application target.

When the engine E is started, hydraulic oil is supplied via the oil pump 3. For example, in a medium to high load mode of the engine E, the electromagnetic actuator 50 is driven, and the valve body 40 is moved by the drive shaft 58b in a direction of compressing the biasing spring 60. As shown in FIG. 21, the first valve part 41 enters a closed valve state that closes the oil passage between the first opening O1 (port 34b) and the second opening O2 (port 34b), and the second valve part 42 enters an open valve state that opens the oil passage between the first opening O1 (port 34b) and the third opening O3 (port 34b).

Accordingly, the hydraulic oil supplied through the first opening O1 (port 34b) is guided to the advance chamber AC via the third opening O3 (port 34b) and the advance oil passages 1e, 4c, and 21c. On the other hand, the hydraulic oil in the retard chamber RC is guided to the discharge opening 36b via the retard oil passages 14, 4b, 1d, and the second opening O2 (port 34b), and is returned to the oil pan 2 through the discharge oil passage 1c.

At this time, the valve timing of the engine E is held at an advance position (here, the most advanced position), as shown in FIG. 22.

According to the oil passage control valve V having the above configuration, the oil passage control valve V includes: the sleeve 30, including the internal passage 31 extending in the predetermined axis S direction and through which hydraulic oil passes, the annular groove 33 formed on the outer periphery, and the opening 34 penetrating in the radial direction in the region of the annular groove 33 and through which hydraulic oil passes; the valve body 40, slidably housed in the internal passage 31 and opening and closing the opening 34; the filter member 70 of a strip-like shape, annularly wrapped around and fixed to the annular groove 33; and the drive element (electromagnetic actuator 50 and biasing spring 60), driving the valve body 40. The sleeve 30 includes the protrusion 35 protruding from the bottom surface 33a and side surface 33b of the annular groove 33 at a position offset from the opening 34 within the region of the annular groove 33. The filter member 70 includes the notch 75 engaged with the protrusion 35 in a side part in the width direction WD in a state fixed to the annular groove 33, the filtration part 76 facing the opening 34, and the joint JP where both end regions overlap. Thus, it is possible to simplify the structure as well as reduce the cost, weight, size or the like, and the filter member 70 can be easily positioned and fixed.

Figure 23:
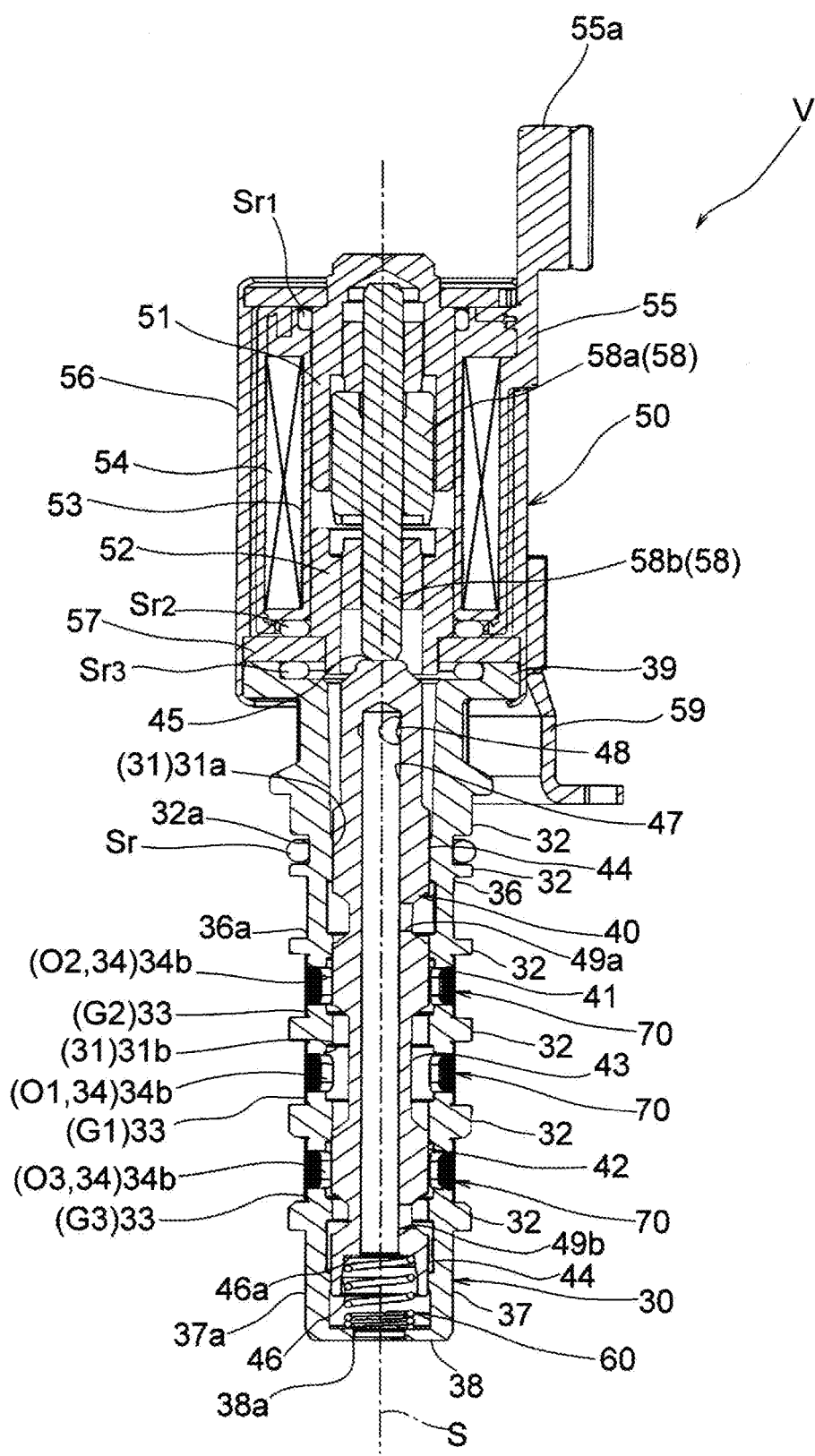
FIG. 23 is a cross-sectional view cut along a plane including an axis of a sleeve in an oil passage control valve according to another embodiment.

In the above embodiment, the sleeve 30 provided with the discharge openings 36b and 37b penetrating in the radial direction has been illustrated as a sleeve. However, the disclosure is not limited thereto. As shown in FIG. 23, the discharge openings 36b and 37b in the sleeve 30 may be eliminated, and discharge openings 49a and 49b may be adopted in the valve body 40 that communicate with the internal passage 47.

In the above embodiment, a configuration has been illustrated in which the convex-rectangular-shaped protrusion 35 is adopted as a protrusion of the sleeve 30 and the concave-rectangular-shaped notch 75 is adopted as a notch of the filter member 70. However, the disclosure is not limited thereto. Any other form may be adopted if it protrudes from a bottom surface and side surface of an annular groove, and a form of being engaged with the form of the protrusion may be adopted for the notch.

In the above embodiment, the first notch 75a and the second notch 75b formed line-symmetrically with respect to the center line CL have been illustrated as the notch formed in a side part of the filter member 70. However, the disclosure is not limited thereto. A filter member having only one notch formed in a side part may be adopted.

In the above embodiment, the filter member 70 formed with the same length Lf from the notch 75 as the center to both ends in the longitudinal direction LD has been illustrated as a filter member. However, the disclosure is not limited thereto. A filter member having a notch at a position deviating from the center in the longitudinal direction LD may be adopted, and a configuration may be adopted in which a second partition wall is arranged at a position overlapping a joint of one end region and the other end region.

In the above embodiment, as a valve timing varying device to which the oil passage control valve V is applied, the valve timing varying device M provided with three vanes 12, three shoe parts 22b, three retard oil passages 14, and three advance oil passages 21c has been illustrated. However, the disclosure is not limited thereto. The oil passage control valve V may be applied to a valve timing varying device provided with four vanes, four shoe parts, four retard oil passages, and four advance oil passages.

In the above embodiment, the oil passage control valve V fitted into the fitting hole 1a of the main body 1 of the engine E has been illustrated as an oil passage control valve. However, the disclosure is not limited thereto. An oil passage control valve may be formed in which a vane rotor included in a valve timing varying device is fitted into a fitting hole of a fastening bolt for fastening to a camshaft.

In the oil passage control valve V according to the above embodiment, the electromagnetic actuator 50 and the biasing spring 60 have been illustrated as the drive element. However, the disclosure is not limited thereto. A drive element that deforms according to a temperature of hydraulic oil and exerts a driving force may be adopted. For example, a shape memory alloy, a thermoelement having paraffin wax built therein, or bimetal, may be adopted.

As described above, according to the oil passage control valve and the valve timing varying device of the disclosure, it is possible to simplify the structure as well as reduce the cost, weight, size or the like, and the filter member can be easily positioned and fixed. Hence, the oil passage control valve and the valve timing varying device can be applied not only to an engine mounted on a vehicle or the like, but also to an engine mounted on any other vehicle such as a motorcycle. The oil passage control valve of the disclosure is useful not only for a valve timing varying device but also for any other device that controls an oil passage.

The invention claimed is:

1. An oil passage control valve, comprising:
a sleeve, comprising an internal passage extending in a predetermined axis direction and through which hydraulic oil passes, an annular groove formed on an outer periphery, and an opening penetrating in a radial direction in a region of the annular groove and through which hydraulic oil passes;
a valve body, slidably housed in the internal passage and opening and closing the opening;
a filter member of a strip-like shape, annularly wrapped around and fixed to the annular groove; and
a drive element, driving the valve body, wherein
the sleeve comprises a protrusion protruding from a bottom surface and a side surface of the annular groove at a position offset from the opening within the region of the annular groove; and
the filter member comprises a notch engaged with the protrusion in a side part in a width direction in a state fixed to the annular groove, a filtration part facing the opening, and a joint where both end regions overlap.

2. The oil passage control valve as claimed in claim 1, wherein
the protrusion has a convex rectangular shape; and
the notch has a concave rectangular shape.

3. The oil passage control valve as claimed in claim 1, wherein
the notch comprises, in both side parts in a width direction of the filter member, a first notch and a second notch formed line-symmetrically with respect to a center line in a longitudinal direction of the filter member.

4. The oil passage control valve as claimed in claim 1, wherein
the annular groove comprises, in a boundary region between a bottom surface with which the filter member is in close contact and each of side surfaces erected in the radial direction from both sides of the bottom surface, an annular lightening portion that is more recessed than the bottom surface.

5. The oil passage control valve as claimed in claim 1, wherein
the sleeve comprises, to define the opening, a plurality of ports arranged in a circumferential direction in the annular groove and having an opening width smaller than a width of the annular groove, and a plurality of partition walls separating the plurality of ports from each other; and
the plurality of partition walls comprise a first partition wall on which the protrusion is located in the circumferential direction of the annular groove, and a second partition wall overlapping the joint of the filter member in the circumferential direction of the annular groove.

6. The oil passage control valve as claimed in claim 5, wherein
the plurality of partition walls, except for the second partition wall, each comprise a communication groove that provides communication between two adjacent ports among the plurality of ports between the bottom surface of the annular groove and an inner peripheral surface of the filter member.

7. The oil passage control valve as claimed in claim 5, wherein
the filter member is formed with a same length from the notch as a center to both ends in a longitudinal direction; and
the second partition wall is formed at a position facing the first partition wall in the radial direction of the annular groove.

8. The oil passage control valve as claimed in claim 5, wherein
the joint of the filter member is subjected to welding.

9. The oil passage control valve as claimed in claim 1, wherein
the filtration part of the filter member comprises a plurality of filtration holes; and
a plate thickness of the filter member is smaller than a diameter of the filtration hole.

10. The oil passage control valve as claimed in claim 1, wherein
the drive element comprises a biasing spring that biases the valve body to position the valve body at a rest position, and an electromagnetic actuator that exerts a driving force to position the valve body at an operating position against a biasing force of the biasing spring.

11. The oil passage control valve as claimed in claim 1, wherein
the annular groove comprises a first annular groove, a second annular groove arranged adjacent to one side of the first annular groove in the axis direction, and a third annular groove arranged adjacent to the other side of the first annular groove in the axis direction;
the opening comprises a first opening formed in the first annular groove, a second opening formed in the second annular groove, and a third opening formed in the third annular groove; and
the filter member is wrapped around and fixed to each of the first annular groove, the second annular groove, and the third annular groove.

12. The oil passage control valve as claimed in claim 11, wherein
the first opening comprises a plurality of ports that supply hydraulic oil into the sleeve;
the second opening comprises a plurality of ports that communicate with a first hydraulic chamber of an application target; and
the third opening comprises a plurality of ports that communicate with a second hydraulic chamber of the application target.

13. The oil passage control valve as claimed in claim 11, wherein
the sleeve comprises a discharge opening formed in each of a region opposite to the first opening across the second opening in the axis direction and a region opposite to the first opening across the third opening in the axis direction, in order to discharge hydraulic oil.

14. The oil passage control valve as claimed in claim 11, wherein
the valve body comprises a first valve part opening and closing an oil passage between the first opening and the second opening, and a second valve part opening and closing an oil passage between the first opening and the third opening.

15. The oil passage control valve as claimed in claim 1, wherein
   the sleeve is formed to be fitted into a member that defines an oil passage through which hydraulic oil of an engine passes.

16. A valve timing varying device, for an engine, configured to change opening and closing timing of an intake valve or an exhaust valve driven by a camshaft, the valve timing varying device comprising:
   a housing rotor, rotating on an axis of the camshaft;
   a vane rotor, defining a retard chamber and an advance chamber in cooperation with the housing rotor and rotating on the axis; and
   an oil passage control valve, opening and closing an oil passage that supplies or discharges hydraulic oil to or from the retard chamber and the advance chamber, wherein
   the oil passage control valve is the oil passage control valve as claimed in claim 15.

* * * * *